United States Patent
Park

(10) Patent No.: US 9,811,246 B2
(45) Date of Patent: Nov. 7, 2017

(54) METHOD FOR SETTING IMAGE CAPTURE CONDITIONS AND ELECTRONIC DEVICE PERFORMING THE SAME

(71) Applicant: Samsung Electronics Co., Ltd., Gyeonggi-do (KR)

(72) Inventor: Wan Je Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/597,916

(22) Filed: Jan. 15, 2015

(65) Prior Publication Data
US 2015/0199098 A1 Jul. 16, 2015

(30) Foreign Application Priority Data
Jan. 15, 2014 (KR) ........................ 10-2014-0004993

(51) Int. Cl.
G06F 3/048 (2013.01)
G06F 3/0484 (2013.01)
H04N 7/18 (2006.01)
G06F 3/0488 (2013.01)
H04N 5/232 (2006.01)
H04N 5/235 (2006.01)

(52) U.S. Cl.
CPC ........ *G06F 3/0484* (2013.01); *G06F 3/04883* (2013.01); *H04N 5/235* (2013.01); *H04N 5/23212* (2013.01); *H04N 5/23216* (2013.01); *H04N 5/23296* (2013.01); *H04N 7/18* (2013.01); *H04N 5/23293* (2013.01)

(58) Field of Classification Search
CPC . G06F 3/0484; H04N 5/23212; H04N 5/2316
See application file for complete search history.

(56) References Cited

U.S. PATENT DOCUMENTS

| | | | |
|---|---|---|---|
| 8,502,901 B2 | 8/2013 | Lee et al. | |
| 2009/0015703 A1 | 1/2009 | Kim et al. | |
| 2010/0156941 A1 | 6/2010 | Seung | |
| 2011/0019058 A1 | 1/2011 | Sakai et al. | |
| 2011/0115925 A1 | 5/2011 | Oh | |
| 2011/0267524 A1 | 11/2011 | Lee et al. | |
| 2011/0267530 A1 | 11/2011 | Chun | |
| 2011/0285745 A1 | 11/2011 | Zhang et al. | |
| 2013/0104065 A1* | 4/2013 | Stecher | G06F 3/0481 715/767 |
| 2013/0293759 A1 | 11/2013 | Lee et al. | |
| 2013/0342747 A1 | 12/2013 | Park | |
| 2014/0098255 A1* | 4/2014 | Miura | G06F 3/0416 348/208.99 |

OTHER PUBLICATIONS

European Search Report dated May 29, 2015 issued in counterpart application No. 15151243.1-1903, 13 pages.

* cited by examiner

*Primary Examiner* — Omar Abdul-Ali
(74) *Attorney, Agent, or Firm* — The Farrell Law Firm, P.C.

(57) ABSTRACT

Methods and apparatuses are provided for setting shooting image capture conditions. A first touch input is sensed on a touch screen in an image capture mode. An area related to a first function is generated at a first position where the first touch input is sensed has occurred. A first area related to a second function is generated at the first position overlapping the area related to the first function, when the first touch input is held at the first position for at least a first period of time.

23 Claims, 20 Drawing Sheets

METHOD FOR SETTING IMAGE CAPTURE CONDITIONS AND ELECTRONIC DEVICE PERFORMING THE SAME

PRIORITY

This application claims priority under 35 U.S.C. §119(a) to Korean Patent Application No. 10-2014-0004993, filed Jan. 15, 2014, the content of which is incorporated herein by reference.

BACKGROUND OF THE INVENTION

1. Field of the Invention

The present invention relates generally to an electronic device, and more particularly, to a method for setting various image capture conditions in an electronic device and an electronic device for performing the same.

2. Background of the Invention

Mobile devices (or electronic devices) include high-end camera functions.

A user may experience difficulties when learning complex operating methods that are required to set image capture conditions of the camera modules.

SUMMARY OF THE INVENTION

The present invention has been made to address at least the above problems and/or disadvantages and to provide at least the advantages described below. Accordingly, an aspect of the invention is directed to providing a method for setting image capture conditions and an electronic device for performing the same.

Another aspect of the present invention is directed to providing a computer-readable recording medium for recording a program for performing the method in a computer.

According to an embodiment of the present invention, a method is provided for setting shooting image capture conditions. A first touch input is sensed on a touch screen in an image capture mode. An area related to a first function is generated at a first position where the first touch input is sensed has occurred. A first area related to a second function is generated at the first position overlapping the area related to the first function, when the first touch input is held at the first position for at least a first period of time.

According to another embodiment of the present invention, an electronic device is provided that includes a camera module configured to perform image capturing according to image capture conditions set by a control unit, and a touch screen configured to display a screen according to a control signal of the control unit and sense a touch input. The electronic device also includes the control unit configured to control the touch screen so that the touch screen senses a first touch input in an image capture mode, generates an area related to a first function at a first position where the first touch input is sensed, and generates a first area related to the second function at the first position overlapping the area related to the first function when the first touch input is held at the first position for at least a first period of time, to set the first function for the camera module based on the area related to the first function, and to set the second function for the camera module based on the first area related to the second function.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
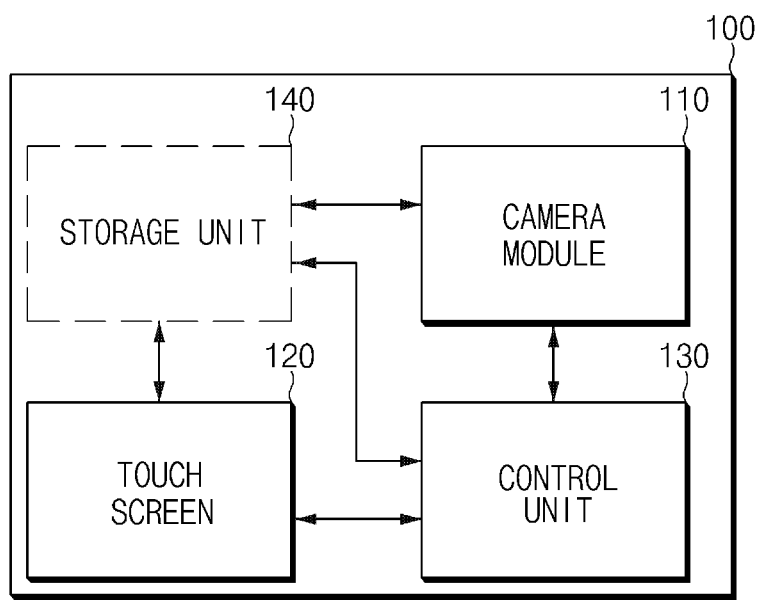
FIG. 1 is a block diagram illustrating an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms "first", "second", "A", "B", "(a)", "(b)" and the like may be used herein to describe elements of the embodiments of the present invention. However, the terms are only used to distinguish one element from other elements, and the attributes and the order of the elements are not limited by the terms. It will be understood that when an element is referred to as being "connected" or "coupled" to another element, it can be directly connected or coupled to the other element, or intervening elements may be present.

In the drawings, some elements may be exaggerated, omitted, or schematically illustrated. The sizes of elements in the drawings do not reflect the actual sizes of the elements. Therefore, the present disclosure is not limited to the relative sizes or distances among the elements illustrated in the drawings.

FIG. 1 is a block diagram illustrating an electronic device, according to an embodiment of the present invention.

Referring to FIG. 1, an electronic device 100 includes a camera module 110, a touch screen 120, and a control unit 130. Those skilled in the art would understand that general elements other than those elements illustrated in FIG. 1 may also be further included in the electronic device.

The electronic device 100, according to an embodiment of the present embodiment, may set image capture conditions on the basis of a touch input sensed by the touch screen 120, and may capture a photograph according to the set image capture conditions.

The electronic device 100, according to an embodiment of the present invention, may be embodied as a cell phone, a smartphone, a tablet personal computer (PC), a notebook computer, a terminal for digital broadcast, a digital camera, a portable game terminal, a personal digital assistant (PDA), a portable multimedia player (PMP), a navigator, or a printer provided with the camera module 110. However, the electronic device 100 is not limited thereto, and may be embodied as any data communication device or multimedia device provided with the camera module 110 and an application device therefor.

The camera module 110 provides an image capture function. The camera module 110 may obtain a still image or a video. The camera module 110, according to an embodiment of the present invention, may provide at least one of the functions of auto focus, auto exposure, and custom white balance. However, the camera module 110 is not limited thereto, and may provide various other functions such as zoom in, zoom out, image capture, continuous image capture, timer, flash, screen mode, and filter.

A user may set image capture conditions and obtain a desired image using the functions provided by the camera module 110. The camera module 110 may capture a photograph according to the set image capture conditions.

The camera module 110 may provide, through the touch screen 120, a preview or liveview image to show in advance an image to be captured in an image capture mode. When the image capture conditions are set by the user, the camera module 110 may provide the preview or liveview image to which the image capture conditions are applied.

The camera module 110, according to an embodiment of the present invention, may include a capturing device for obtaining an image and an image sensor for processing an obtained still image or video. The camera module 110 may further include an image processor for performing image processing on the still image or video obtained by the image sensor.

The touch screen 120 displays a screen and senses a touch input on the screen according to a control signal of the control unit 130.

The touch screen 120 displays an area related to a predetermined function according to a touch input of the user. For example, when the touch input of the user is sensed by the touch screen 120, the touch screen 120 may display, on a touch-input-sensed position, a focus area that is a criterion of auto focus, an exposure area that is a criterion of auto exposure, and a white balance area that is a criterion of custom white balance in predetermined forms.

The touch screen 120 may display a plurality of areas related to predetermined functions in different sizes and forms. For example, the touch screen 120 may display the focus area in the form of a quadrangle and may display the exposure area in the form of a rounded quadrangle larger than the focus area. The touch screen 120 may display the white balance area in the form of a dotted-line rectangle larger than the focus area and the exposure area. The areas related to the predetermined functions, such as, for example, the focus area, the exposure area, and the white balance area, described herein and illustrated in the drawings, are merely examples, and the areas are not limited thereto in terms of the forms and sizes thereof.

The touch screen 120 may convert changes of states of sensors provided to a surface of the touch screen 120, such as, for example, a change of pressure applied to the surface, a change of capacitance, and a change of light intensity, into electric signals to sense a touch input.

The touch screen 120 may be one of various types of touch screens such as, for example, a resistive touch screen, a capacitive touch screen, an ultrasonic touch screen, an infrared touch screen, and the like. Hereinafter, the touch screen 120 is described as a capacitive touch screen that senses a touch input based on a contact of a body or object on the surface of the touch screen 120.

The touch screen 120 may sense a motion or pattern of the touch input of the user. The touch screen 120 may sense the position, the duration, the motion, a starting point, a finishing point, a movement direction, a movement distance, or a moving speed of the touch input at the time of the motion, using state changes of the sensors. For example, the touch screen 120 may sense a touch input such as a drag, flick, tap, touch and hold, double tap, panning, or sweep.

The touch screen 120 may transmit a sensed touch input to the control unit 130. On the basis of the sensed touch input, the control unit 130 may allow a corresponding function to be performed according to the motion or pattern of the touch input of the user.

For example, the control unit 130 may perform a control operation so that at least one of the focus area, the exposure area, the white balance area, and an area related to a predetermined function is generated, moved, or removed according to a type of the touch input, e.g., tap, drag, long touch, or double tap, sensed by the touch screen 120.

The control unit 130 controls the overall operation of the electronic device 100 including the camera module 110 and the touch screen 120. According to an embodiment of the present invention, the control unit 130 may include at least one processor.

The control unit 130 may control the touch screen 120 so that an area related to a predetermined function, e.g., the focus area, the exposure area, or the white balance area, is displayed on a position desired by the user, based on the touch input sensed by the touch screen 120.

The control unit 130 may control the camera module 110 so that the predetermined function, e.g., the auto exposure, the auto focus, or the custom white balance, is set in a position desired by the user, based on the touch input sensed by the touch screen 120.

When the touch input is released after the area related to the predetermined function is displayed, the control unit 130 may control the camera module 110 so that the camera module 110 automatically captures a photograph by applying the predetermined function with respect to the area related to the predetermined function displayed on the touch screen 120 at the time of the release of the touch input. When at least two areas, among at least one area related to a first function, at least one area related to a second function, and at least one area related to the predetermined function, are displayed on the touch screen 120 at the time of the release of the touch input, the control unit 130 may control the camera module 110 so that the camera module 110 captures a photograph by applying all of the functions corresponding to the plurality of areas.

Hereinafter, the setting of the auto focus, the auto exposure, and the custom white balance, among the various functions provided by the camera module 110, are described as an example. However, an area related to a predetermined function may be displayed and the predetermined function may be set in the same manner as that for the auto focus, the auto exposure and the custom white balance.

The auto focus (also referred to herein as "AF") may be set by generating the focus area on the touch screen 120. The control unit 130 may set the auto focus based on a position of the focus area.

The auto exposure (also referred to herein as "AE") may be set by generating the exposure area on the touch screen 120. The control unit 130 may adjust an exposure value (also referred to herein as "EV") based on a position of the exposure area.

The custom white balance (also referred to herein as "CWB") may be set by generating the white balance area on the touch screen 120. The control unit 130 may adjust the custom white balance based on a position of the white balance area.

According to an embodiment of the present invention, the electronic device 100 may further include a storage unit 140.

The storage unit 140, which is a typical storage medium, may include a captured image obtained by the camera module 110. Furthermore, the storage unit 140 may store information displayed on the touch screen 120.

The storage unit 140 may store data or a program required for the camera module 110 to capture a photograph or for the touch screen 120 to display a screen or control a touch input. Furthermore, the storage unit 140 may store a program routine or a command set required for the control unit 130 to control the camera module 110 or the touch screen 120. In addition, the storage unit 140 may store data or a program for operating the electronic device 100. The storage unit 140, according to an embodiment of the present invention, may be implemented with a Hard Disk Drive (HDD), a Read Only Memory (ROM), a Random Access Memory (RAM), a flash memory, a memory card, a NAND memory, or a Solid State Drive (SSD).

FIGS. 2A to 2D are diagrams illustrating a screen of the electronic device on which the focus area and the exposure area are set, according to an embodiment of the present invention.

The setting of the auto focus and the auto exposure, among the various functions, is described in accordance with an embodiment of the present invention. However, an area related to a predetermined function may be displayed and the predetermined function may be set in the same manner as that described herein for the auto focus and the auto exposure. Therefore, a focus area 10 and an exposure area 20 may represent an area related to a first function and an area related to a second function, respectively.

Figure 2A:
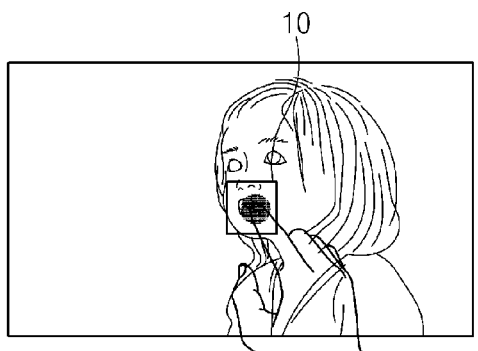
FIGS. 2A to 2D are diagrams illustrating a screen of the electronic device on which a focus area and an exposure area are set, according to an embodiment of the present invention.

FIG. 2A is a diagram illustrating the focus area 10 generated on the touch screen 120 by a touch of the user.

In the image capture mode, the touch screen 120 senses a first touch input of the user, and generates the focus area 10 at a first position on the touch screen 120 where the first touch input occurred.

For example, the user may touch the touch screen 120 with a finger to generate the first touch input. The user may also use a part of the body other than the fingers or an object capable of changing the states of the sensors of the touch screen 120, such as, for example, a touch pen, to generate the touch input.

Figure 2B:
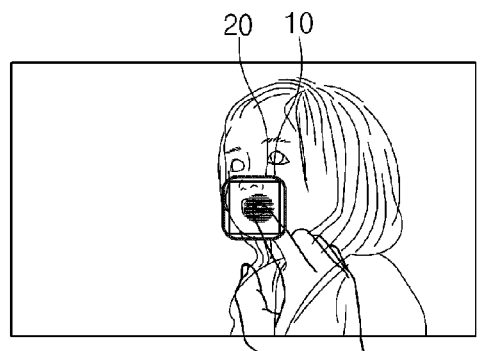

FIG. 2B is a diagram illustrating the exposure area 20 generated on the touch screen 120 by holding a touch by the user.

When the first touch input of the user is held for at least a first period of time at the first position, the touch screen 120 generates the exposure area 20 at the first position on the touch screen 120, so that the focus area 10 and the exposure area 20 are overlapped.

The exposure area 20 may be different from the focus area 10 in terms of at least one of shape, size, and color, so that the overlapped areas are distinguished from each other. For example, the focus area 10 may have a quadrilateral shape, and the exposure area 20 may have a rounded quadrilateral shape and may be larger than the focus area 10. However, the shapes and sizes of the focus area 10 and the exposure area 20 are not limited thereto, and the focus area 10 and the exposure area 20 may have various shapes and sizes.

Figure 2C:
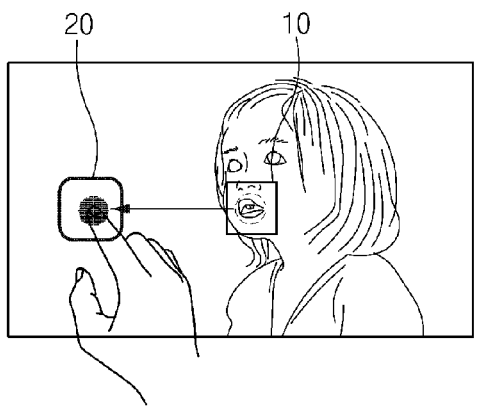

FIG. 2C is a diagram illustrating that the exposure area 20 is moved on the touch screen 120 by moving a touch by the user.

When the first touch input of the user is moved on the touch screen 120, the touch screen 120 moves the exposure area 20 according to the movement of the first touch input. The focus area 10 is maintained at the first position and is not moved with the exposure area 20. That is, when the user moves the touch that has generated the focus area 10 on the touch screen 120 without releasing the touch, the exposure area 20 is moved separately from the focus area 10.

Figure 2D:
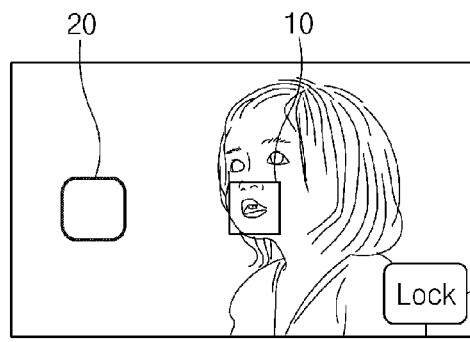

FIG. 2D is a diagram illustrating the focus area 10 and the exposure area 20 set on the touch screen 120 by releasing the touch of the user.

When the first touch input of the user is released after moving from the first position by at least a predetermined distance, the touch screen 120 displays the exposure area 20 at a position where the first touch input has been released. If the first touch input is released within the predetermined distance from the first position, the exposure area 20 disappears without being displayed on the touch screen 120.

That is, when the user releases the touch that has generated the focus area 10 on the touch screen 120, after moving the touch by the predetermined distance, the focus area 10 and the exposure area 20 are set apart from each other. In this manner, the user may set the focus area 10 and the exposure area 20 at desired positions using a single touch.

This embodiment of the present invention resolves the inconvenience of a conventional image capture condition setting method according to which the focus area and the exposure area are generated and then moved to desired positions by touching each of the focus area and the exposure area.

Furthermore, this embodiment of the present invention resolves the inconvenience of a conventional image capture condition setting method according to which the focus area and the exposure area are concurrently generated so as to be overlapped, and are then separated from each other by a precise touch in order to set the focus area and the exposure area.

Moreover, this embodiment of the present invention resolves the inconvenience of a conventional image capture condition setting method according to which the focus area is generated first, and then the exposure area is set by selecting one corner of the focus area with a precise touch.

According to an embodiment of the present invention, after setting the focus area 10 and the exposure area 20 on the touch screen 120 as described above, the control unit 130 may provide a locking function 50 for preventing the set focus area 10 and exposure area 20 from being moved or removed, as described in greater detail below with reference to FIGS. 8A and 8B.

FIGS. 3A to 3D are diagrams illustrating a screen of the electronic device on which the white balance area is set, according to an embodiment of the present invention.

An area related to a predetermined function may be displayed and the predetermined function may be set in the same manner as that of the white balance. Therefore, the focus area 10, the exposure area 20, and a white balance area 30 may represent the area related to the first function, the area related to the second function, and an area related to a third function, respectively.

Figure 3A:
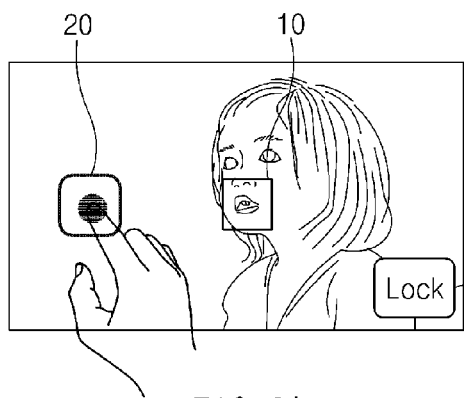
FIGS. 3A to 3D are diagrams illustrating a screen of the electronic device on which a white balance area is set, according to an embodiment of the present invention.

FIG. 3A is a diagram illustrating that the user touches the exposure area 20 displayed on the touch screen 120.

The touch screen 120 displays the focus area 10 and the exposure area 20, and senses a second touch input of the user. The second touch input is a new touch input occurring on the exposure area 20. A position where the second touch input has occurred is referred to as a second position.

The present invention is not limited to an embodiment in which the focus area 10 and the exposure area are displayed on the screen. Thus, if at least one exposure area 20 is displayed on the screen, the white balance area 30 may be generated using the displayed exposure area 20.

Figure 3B:
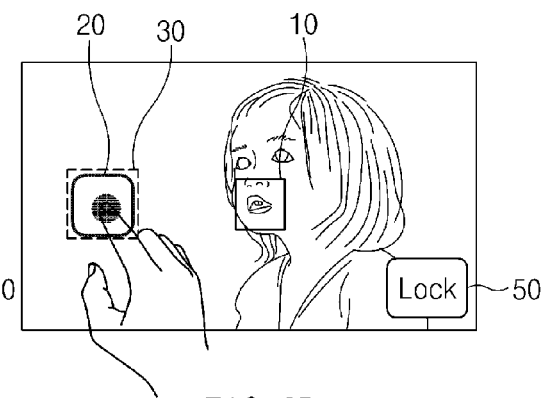

FIG. 3B is a diagram illustrating that the white balance area 30 is generated on the touch screen 120 by holding a touch by the user.

When the second touch input of the user is held for at least the first period of time at the second position, the touch screen 120 generates the white balance area 30 at the second position on the touch screen 120 so that the exposure area 20 and the white balance area 30 overlap. That is, when the user holds the touch on the exposure area 20 for a predetermined period of time without releasing the touch, the white balance area 30 may be generated.

The white balance area 30 may be different from the focus area 10 and the exposure area 20 in terms of at least one of shape, size, and color, so that the white balance area 20 is distinguished from the focus area 10 and the exposure area 20. For example, the shape of the white balance area 30 may be a dotted-line rectangle larger than the focus area 10 and the exposure area 20. However, the shape and size of the white balance area 30 are not limited thereto, and the white balance area 30 may have various shapes and sizes different from those of the focus area 10 and the exposure area 20.

Figure 3C:
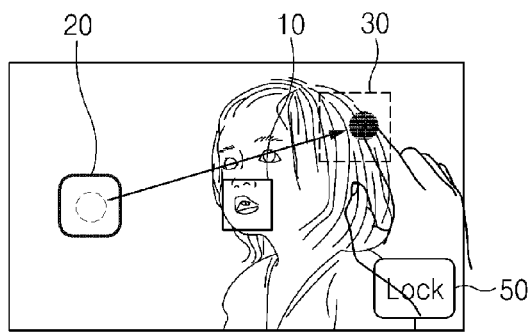

FIG. 3C is a diagram illustrating that the white balance area 30 is moved on the touch screen 120 by moving a touch by the user.

When the second touch input of the user is moved on the touch screen 120, the touch screen 120 moves the white balance area 30 according to the movement of the second touch input. The exposure area 20 is maintained at the second position without being moved with the white balance area 30. That is, when the user moves the touch that has generated the white balance area 30 on the touch screen 120, without releasing the touch, the white balance area 30 may be moved separately from the exposure area 20.

Figure 3D:
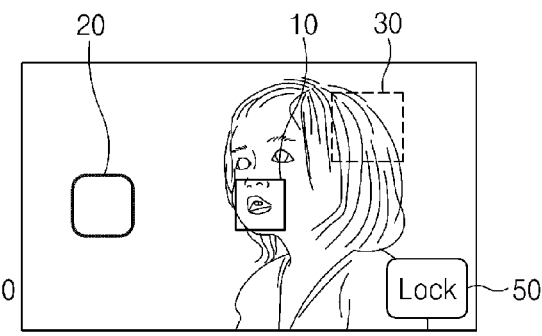

FIG. 3D is a diagram illustrating that the white balance area 30 is set on the touch screen 120 by releasing a touch by the user.

When the second touch input of the user is released while separated from the second position by at least a predetermined distance, the touch screen 120 displays the white balance area 30 at a position where the second touch input has been released. If the second touch input is released within the predetermined distance from the second position, the white balance area 30 disappears without being displayed on the touch screen 120.

That is, when the user releases the touch that has generated the white balance area 30 on the touch screen 120, after moving the touch by at least the predetermined distance, the white balance area 30 may be set at a desired position apart from the exposure area 20.

FIGS. 4A to 4D are diagrams illustrating a screen of the electronic device on which the focus area and the white balance area are set, according to an embodiment of the present invention.

Figure 4A:
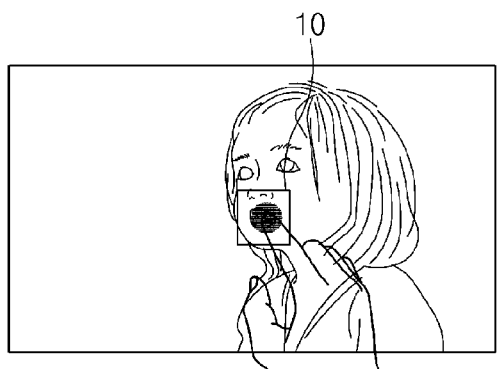
FIGS. 4A to 4D are diagrams illustrating a screen of the electronic device on which the focus area and the white balance area are set, according to an embodiment of the present invention.

FIG. 4A is a diagram illustrating the focus area 10 generated on the touch screen 120 by a touch of the user.

In the image capture mode, the touch screen 120 senses the first touch input of the user, and generates the focus area 10 at the first position on the touch screen 120 where the first touch input has occurred.

Figure 4B:
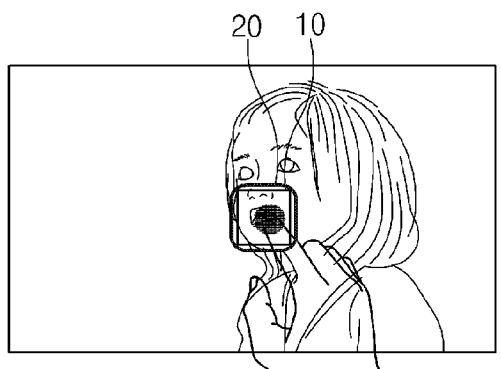

FIG. 4B is a diagram illustrating that the exposure area 20 is generated on the touch screen 120 by holding a touch by the user.

When the first touch input of the user is held for at least the first period of time at the first position, the touch screen 120 generates the exposure area 20 at the first position so that the focus area 10 and the exposure area 20 overlap. That is, when the user holds the touch that has generated the focus area 10 on the touch screen 120 for a predetermined period of time without releasing the touch, the exposure area 20 may be generated.

Figure 4C:
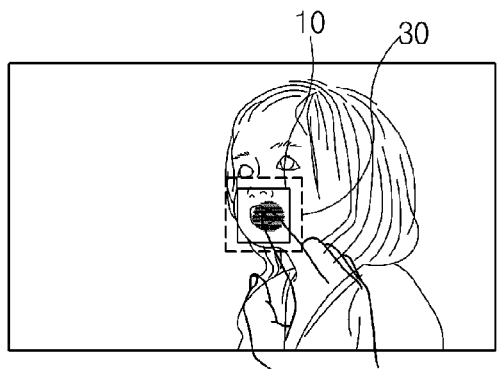

FIG. 4C is a diagram illustrating that the exposure area 20 disappears and the white balance area 30 is generated on the touch screen 120 by holding a touch by the user.

When the first touch input of the user is held for at least a second period of time, which is longer than the first period of time, at the first position, the exposure area 20 disappears and the white balance area 30 is generated at the first position on the touch screen 120 so that the focus area 10 and the white balance area 30 overlap. That is, when the user holds the touch that has generated the focus area 10 for a predetermined period of time, without releasing the touch, even after the exposure area 20 is generated, the exposure area 20 may disappear and the white balance area 30 may be generated.

Figure 4D:
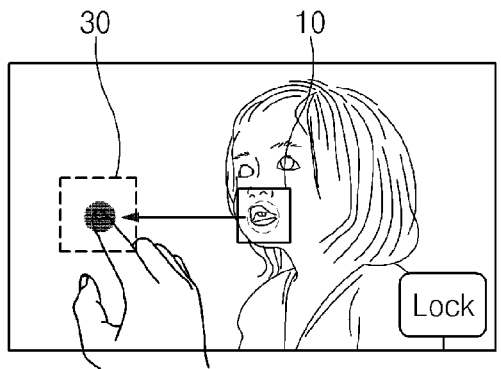

FIG. 4D is a diagram illustrating that the white balance area 30 is moved on the touch screen 120 by moving a touch by the user.

When the first touch input of the user is moved on the touch screen 120, the touch screen 120 moves the white balance area 30 according to the movement of the first touch input. The focus area 10 is maintained at the first position without being moved with the white balance area 30. That is, when the user moves the touch that has generated the focus area 10 on the touch screen 120 without releasing the touch, the white balance area 30 may be moved separately from the focus area 10.

Thereafter, when the user releases the first touch input spaced apart from the first position by at least a predetermined distance, the white balance area 30 may be set at a position where the first touch input has been released. If the first touch input is released within the predetermined distance from the first position, the white balance area 30 disappears without being displayed on the touch screen 120.

In this manner, the user may set the focus area 10 and the white balance area 30 at desired positions using a single touch. Furthermore, the user may set the white balance area 30 without setting or using the exposure area 20.

According to an embodiment of the present invention, after setting the focus area 10 and the white balance area 30 on the touch screen 120 as described above, the control unit 130 may provide the locking function 50 for preventing the set focus area 10 and white balance area 30 from being moved or removed.

FIGS. 5A to 5D are diagrams illustrating a screen of the electronic device on which a plurality of exposure areas are set, according to an embodiment of the present invention.

Setting of the auto exposure, among the various functions, is described according to an embodiment of the present embodiment. However, an area related to a predetermined function may be displayed and the predetermined function may be set in the same manner as that of the auto exposure. Therefore, the focus area 10, the exposure area 20 and a second exposure area 22 may represent the area related to the first function, a first area related to the second function and a second area related to the second function, respectively.

A screen on which the focus area 10 and the exposure area 20 are displayed is used as an example to describe this embodiment of the present invention. However, the embodiments of the present invention are not limited thereto, and thus, if at least one exposure area 20 is displayed on the screen, a new exposure area may be generated using the displayed exposure area 20.

Hereinafter, for convenience of explanation, an exposure area that is previously generated and displayed on the touch screen 120 is referred to as the first exposure area 20, and an exposure area newly generated from the first exposure area 20 is referred to as the second exposure area 22.

Figure 5A:
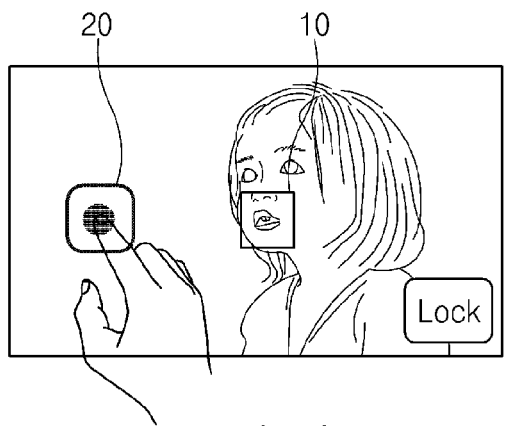
FIGS. 5A to 5D are diagrams illustrating a screen of the electronic device on which a plurality of exposure areas are set, according to an embodiment of the present invention.

FIG. 5A is a diagram illustrating that the user touches the first exposure area 20 displayed on the touch screen 120.

The touch screen 120 displays the focus area 10 and the first exposure area 20, and senses a second touch input of the user. The second touch input is a new touch input occurring on the first exposure area 20. A position where the second touch input has occurred is referred to as the second position.

Figure 5B:
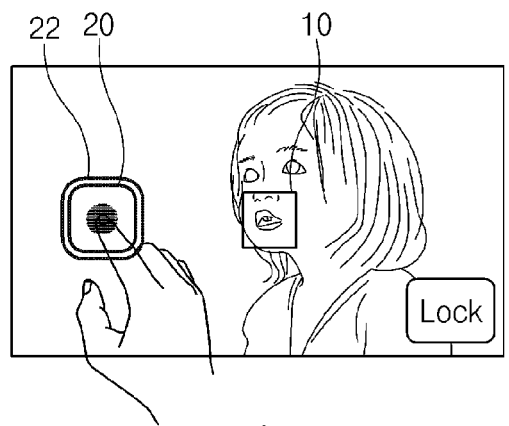

FIG. 5B is a diagram illustrating that the second exposure area 22 is generated on the touch screen 120 by holding a touch by the user.

When the second touch input of the user is held for at least the first period of time at the second position, the touch screen 120 generates the second exposure area 22 at the second position on the touch screen 120 so that the first exposure area 20 and the second exposure area 22 overlap. That is, when the user holds the touch on the first exposure area 20 for a predetermined period of time without releasing the touch, the second exposure area 22 may be generated.

The second exposure area 22 may be different from the first exposure area 20 in terms of size so as to be distinguished from the first exposure area 20. For example, the second exposure area 22 may be larger than the first exposure area 20. However, the shapes and sizes of the first and second exposure areas 20 and 22 are not limited to those illustrated in FIGS. 5A to 5D.

Figure 5C:
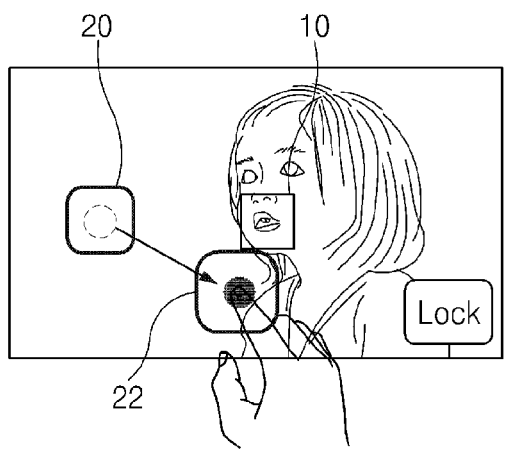

FIG. 5C is a diagram illustrating that the second exposure area 22 is moved on the touch screen 120 by moving a touch by the user.

When the second touch input of the user is moved on the touch screen 120, the touch screen 120 moves the second exposure area 22 according to the movement of the second touch input. The first exposure area 20 is maintained at the second position without being moved with the second exposure area 22. That is, when the user moves the touch that has generated the second exposure area 22 on the touch screen 120 without releasing the touch, the second exposure area 22 may be moved separately from the first exposure area 20.

Figure 5D:
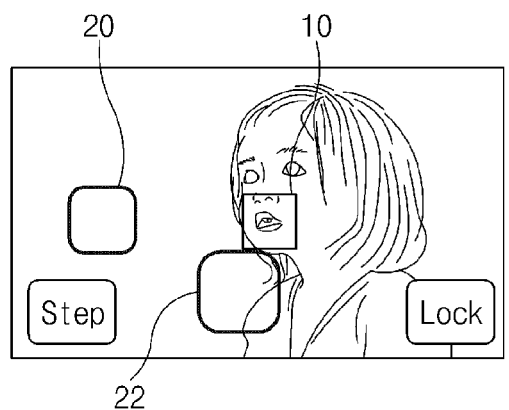

FIG. 5D is a diagram illustrating that the second exposure area 22 is set on the touch screen 120 by releasing a touch by the user.

When the second touch input of the user is released while being spaced apart from the second position by at least a predetermined distance, the touch screen 120 displays the second exposure area 22 at a position where the second touch input has been released. If the second touch input is released within the predetermined distance from the second position, the second exposure area 22 disappears without being displayed on the touch screen 120.

That is, when the user moves the touch that has generated the second exposure area 22 on the touch screen 120 by at least the predetermined distance and then releases the touch, the second exposure area 22 may be set at a desired position apart from the first exposure area 20.

According to an embodiment of the present invention, after the second touch input is released, the second exposure area 22 may be reduced to the size of the first exposure area 20.

According to an embodiment of the present invention, when two or more exposure areas are displayed on the touch screen 120, the control unit 130 may perform a control operation so that the auto exposure is set with an average of the two or more exposure areas to capture a photograph.

According to an embodiment of the present invention, when two or more exposure areas are displayed on the touch screen 120, the control unit 130 may provide a step function 40 for sequentially setting the auto exposure for each of the two or more exposure areas sequentially, as described in greater detail below with reference to FIGS. 7A and 7B.

FIGS. 6A to 6D are diagrams illustrating a screen of the electronic device on which a plurality of exposure areas are set, according to an embodiment of the present invention.

The focus area 10, the first exposure area 20, the second exposure area 22, and a third exposure area 24 may represent the area related to the first function, the first area related to the second function, the second area related to the second function, and a third area related to the second function, respectively.

A screen on which the focus area 10 and two exposure areas, i.e., the first exposure area 20 and the second exposure area 22, are displayed is used as an example in describing this embodiment of the present embodiment. However, the present embodiment is not limited thereto, and thus, may include a plurality of exposure areas.

Hereinafter, an exposure area newly generated from an exposure area previously generated and displayed on the touch screen 120 is referred to as the third exposure area 24.

Figure 6A:
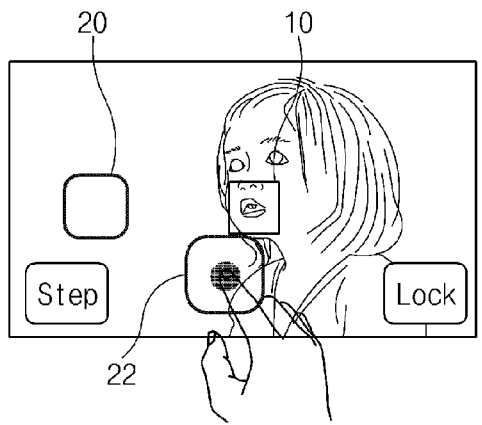
FIGS. 6A to 6D are diagrams illustrating a screen of the electronic device on which a plurality of exposure areas are set, according to an embodiment of the present invention.

FIG. 6A is a diagram illustrating that the user touches the second exposure area 22 displayed on the touch screen 120.

In this embodiment of the present invention, the third exposure area 24 is generated from the second exposure area 22. However, the present embodiment is not limited thereto, and thus, the third exposure area 24 may be generated from at least one of the plurality of exposure areas.

The touch screen 120 displays the focus area 10 and two exposure areas, i.e., the first exposure area 20 and the second exposure area 22, and senses the third touch input of the user. The third touch input may be a new touch input occurring on the second exposure area 22. Here, a position where the third touch input has occurred is referred to as a third position.

Figure 6B:
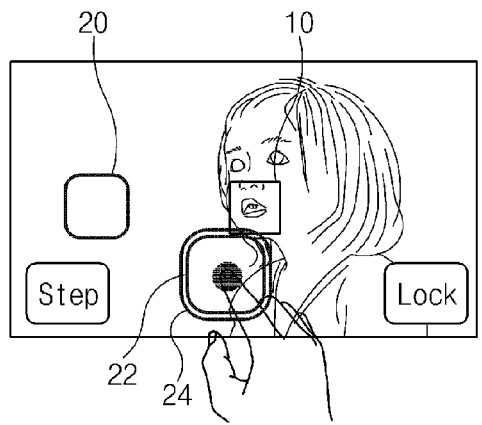

FIG. 6B is a diagram illustrating that the third exposure area 24 is generated on the touch screen 120 by holding a touch by the user.

When the third touch input of the user is held for at least the first period of time at the third position, the touch screen 120 generates the third exposure area 24 at the third position on the touch screen 120 so that the second exposure area 22 and the third exposure area 24 overlap. The third exposure area 24 may be different from the first exposure area 20 and the second exposure area 22 in terms of size so as to be distinguished from the first exposure area 20 and the second exposure area 22. For example, the third exposure area 24 may be larger than the first exposure area 20 and the second exposure area 22.

Figure 6C:
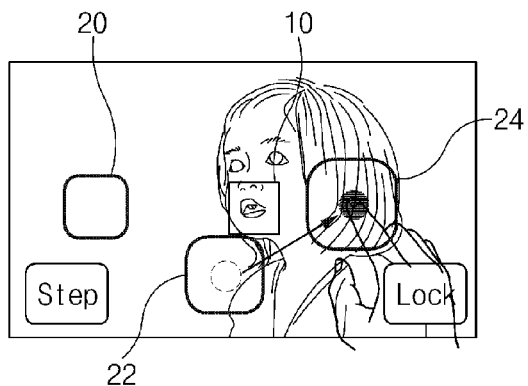

FIG. 6C is a diagram illustrating that the third exposure area 24 is moved on the touch screen 120 by moving a touch by the user.

When the third touch input of the user is moved on the touch screen 120, the touch screen 120 moves the third exposure area 24 according to the movement of the third touch input. The second exposure area 22 is maintained at the third position without being moved with the third exposure area 24.

Figure 6D:
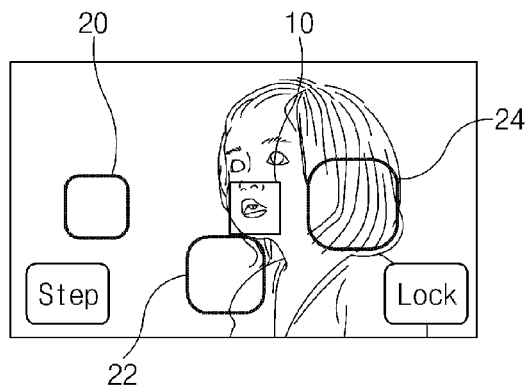

FIG. 6D is a diagram illustrating that the third exposure area 24 is set on the touch screen 120 by releasing a touch by the user.

When the third touch input of the user is released while being spaced apart from the third position by at least a predetermined distance, the touch screen 120 displays the third exposure area 24 at a position where the third touch input has been released. If the third touch input is released within the predetermined distance from the third position, the third exposure area 24 disappears without being displayed on the touch screen 120.

According to an embodiment of the present invention, after the third touch input is released, the second exposure area 22 and the third exposure area 24 may be reduced to the size of the first exposure area 20.

In this manner, the user may set a plurality of exposure areas at different positions on the touch screen 120 by repeatedly generating a new exposure area from one exposure area.

Figure 7A:
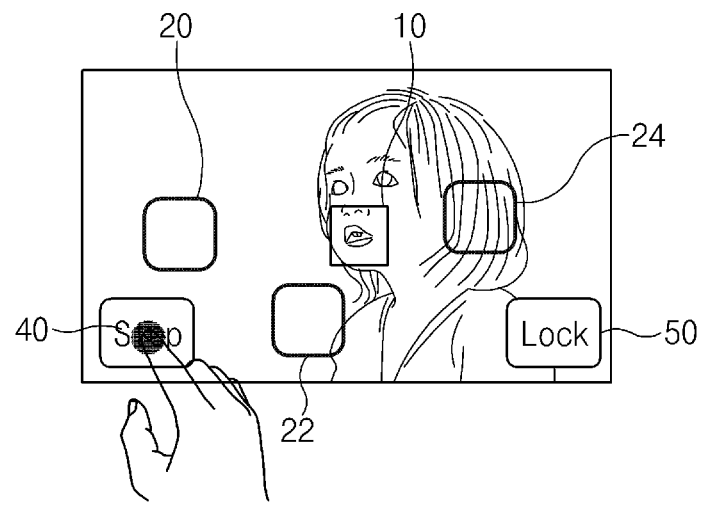
FIGS. 7A and 7B are diagrams illustrating a screen of the electronic device on which a step function is set for a plurality of exposure areas, according to an embodiment of the present invention.
Figure 7B:
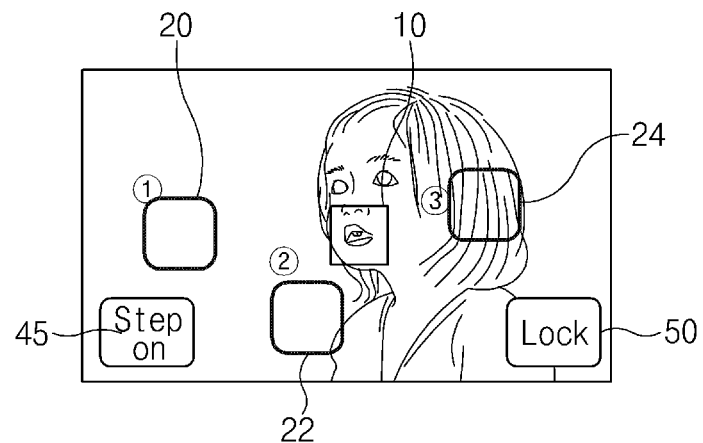

FIGS. 7A and 7B are diagrams illustrating a screen of the electronic device on which a step function is set for a plurality of exposure areas, according to an embodiment of the present invention.

FIG. 7A is a diagram illustrating a screen on which a step function 40 is set for the plurality of exposure areas.

When at least two exposure areas are displayed on the touch screen 120, the control unit 130 may provide the step function 40 on the touch screen 120. The step function 40 allows the auto exposure to be sequentially set for each of the plurality of exposure areas. As illustrated in FIG. 7A, the step function 40 is displayed on the touch screen 120 in the form of a step button.

When the user selects the step function 40, the control unit 130 may perform a control operation so that the step function 40 is applied to at least two exposure areas displayed on the touch screen 120 in order to capture a photograph. If the user does not select the step function 40, the control unit 130 may perform a control operation so that the auto exposure is set with an average of at least two exposure areas.

FIG. 7B is a diagram illustrating a screen on which the step function 40 is applied to the plurality of exposure areas.

When the step function 40 is applied to the plurality of exposure areas, the control unit 130 determines an order of applying the plurality of exposure areas displayed on the touch screen 120.

According to an embodiment of the present invention, as illustrated in FIG. 7B, the touch screen 120 may display the order of applying the plurality of exposure areas. For example, the control unit 130 may determine the order of applying the plurality of exposure areas according to an order of generating the plurality of exposure areas. Alternatively, the control unit 130 may determine the order of applying the plurality of exposure areas in consideration of positions at which the plurality of exposure areas are displayed on the touch screen 120.

When the order of applying the plurality of exposure areas is determined, the control unit 130 may sequentially set the auto exposure for each of the plurality of exposure areas, and the camera module 110 may sequentially capture a photograph corresponding to each setting of the auto exposure.

According to an embodiment of the present invention, when the step function 40 is applied to the plurality of exposure areas, the touch screen 120 may display a "step on" indicator 45 to indicate that the step function 40 is applied to the plurality of exposure areas, as illustrated in FIG. 7B.

Figure 8A:
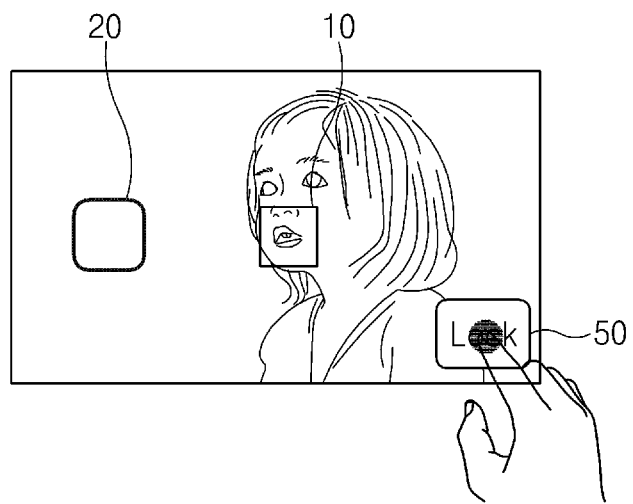
FIGS. 8A and 8B are diagrams illustrating a screen on which the locking function is set, according to an embodiment of the present invention.
Figure 8B:
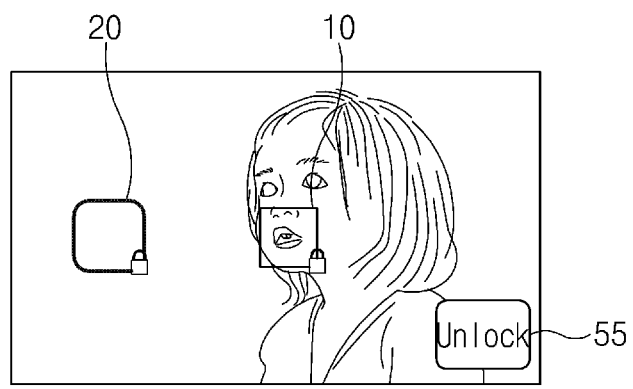

FIGS. 8A and 8B are diagrams illustrating a screen on which the locking function is set, according to an embodiment of the present invention.

The focus area 10 and the exposure area 20 are used to describe this embodiment of the present invention. However, the embodiments of present invention are not limited thereto.

Thus, the locking function 50 may be applied to one or more of a focus area, an exposure area, and a white balance area.

FIG. 8A is a diagram illustrating a screen on which the locking function 50 is set.

When at least one of the focus area, the exposure area, and the white balance area is displayed on the touch screen 120, the control unit 130 may provide the locking function 50 to at least one of the displayed areas. The locking function 50 prevents the at least one of the displayed areas from being moved or removed. As illustrated in FIG. 8A, the locking function 50 may be displayed on the touch screen 120 in the form of a lock button (shown as "Lock").

According to an embodiment of the present invention, when at least one of the focus area, the exposure area, and the white balance area is displayed on the touch screen 120, and the user selects the locking function 50, the control unit 130 may apply the locking function 50 to the displayed areas. That is, for example, the locking function 50 may be applied to the focus area 10 and the exposure area 20, as illustrated in FIG. 8A.

However, the embodiments of the present invention are not limited thereto, and thus, the control unit 130 may apply the locking function 50 to each of the focus area 10 and the exposure area 20.

FIG. 8B is a diagram illustrating a screen on which the locking function 50 is applied.

When the locking function 50 is set on the focus area 10 and the exposure area 20 displayed on the touch screen 120, the locked focus area 10 and exposure area 20 are maintained at the same positions even after a photograph is captured.

According to an embodiment of the present invention, as illustrated in FIG. 8B, the touch screen 120 may indicate that the focus area 10 and the exposure area 20 are in a locked state.

According to an embodiment of the present invention, as illustrated in FIG. 8B, the touch screen 120 may display an unlock button 55 for releasing the locking function 50 when the locking function 50 is set.

FIGS. 9A to 9D are diagrams illustrating a screen on which the focus area and the exposure area are set, according to an embodiment of the present invention.

According to an embodiment of the present invention, unlike the embodiment of FIGS. 2A to 2D, a time required until the exposure area 20 is generated after the focus area 10 is generated may be displayed on the touch screen 120 so that the user is able to check the time. In this embodiment of the present invention, the time is displayed in such a manner that an outline of the exposure area 20 is gradually filled as time elapses after displaying the outline of the exposure area 20. However, the embodiments of the present invention are not limited thereto, and thus, the time required until the exposure area 20 is generated may be displayed on the touch screen 120 in various forms.

Figure 9A:
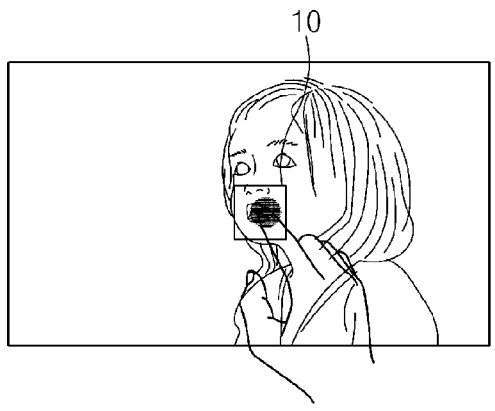
FIGS. 9A to 9D are diagrams illustrating a screen on which the focus area and the exposure area are set, according to an embodiment of the present invention.

FIG. 9A is a diagram illustrating the focus area 10 generated on the touch screen 120 by a touch of the user.

In the image capturing mode, the touch screen 120 senses the first touch input of the user, and generates the focus area 10 at the first position on the touch screen 120 where the first touch input has occurred.

Figure 9B:
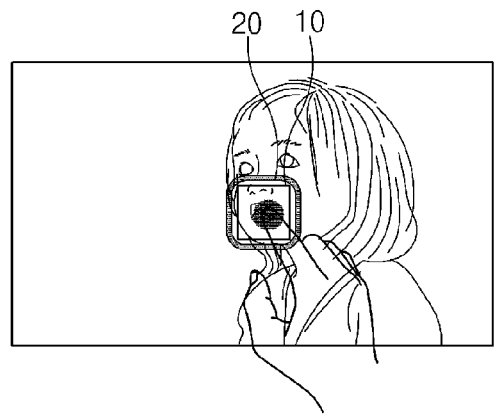

FIG. 9B is a diagram illustrating the outline of the exposure area 20 generated on the focus area 10 on the touch screen 120.

When the first touch input is maintained at the first position after the focus area 10 is generated at the first position, the touch screen 120 displays the outline of the exposure area 20 at a position where the exposure area 20 is to be generated so that the outline overlaps the focus area 10.

Figure 9C:
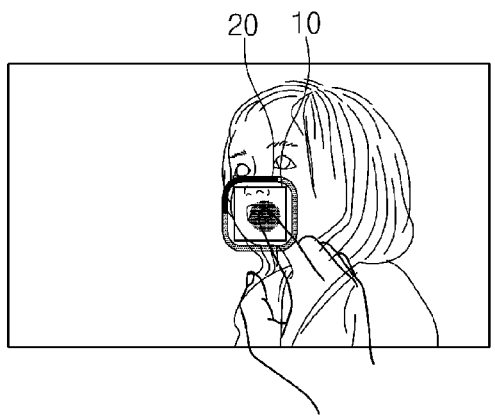

FIG. 9C illustrates that the outline of the exposure area 20 is filled on the touch screen when the touch of the user is held.

When the first touch input is held at the first position, the touch screen 120 gradually fills the outline of the exposure area 20 as time elapses after the focus area 10 is generated.

Figure 9D:
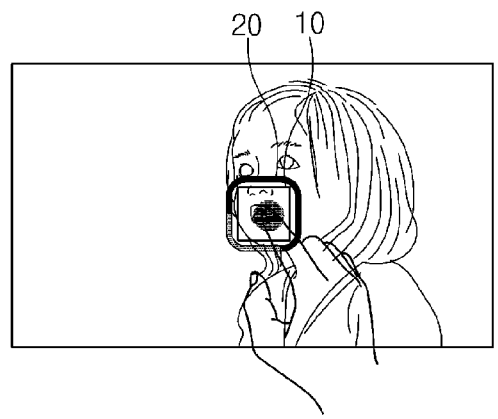

FIG. 9D illustrates that the outline of the exposure area 20 is filled on the touch screen 120 when the touch of the user is held.

When the first touch input is held at the first position, the touch screen 120 fills the outline of the exposure area 20 as time elapses until the holding time of the first touch input reaches the first period of time.

When the holding time of the first touch input reaches the first period of time, the touch screen 120 generates the exposure area 20 so that the focus area 10 and the exposure area 20 overlap at the first position on the touch screen 120. As described above with reference to FIGS. 2A to 2D, when the first touch input of the user is released while being spaced apart from the first position by at least a predetermined distance, the exposure area 20 may be displayed at a position where the first touch input has been released.

Figure 10A:
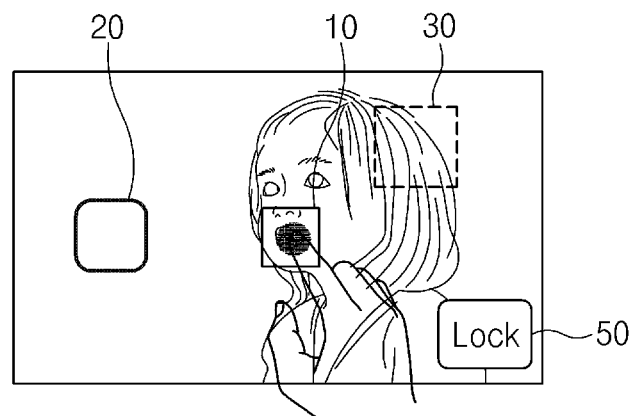
FIGS. 10A and 10B are diagrams illustrating a screen on which a set focus area is moved, according to an embodiment of the present invention.
Figure 10B:
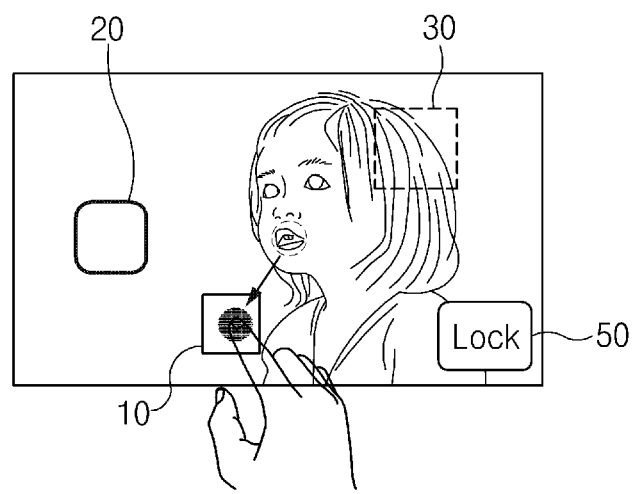

FIGS. 10A and 10B are diagrams illustrating a screen on which a set focus area is moved, according to an embodiment of the present invention.

The focus area 10, the exposure area 20, and the white balance area 30 are used in describing this embodiment of the present invention. However, the embodiments of the present invention are not limited thereto.

FIG. 10A is a diagram illustrating the focus area 10 displayed on the touch screen 120 selected by a touch of the user.

FIG. 10B is a diagram illustrating that the focus area 10 displayed on the touch screen 120 is moved in accordance with movement of the touch of the user.

When the touch input on the focus area 10 is moved on the touch screen 120 without being released, the touch screen 120 may move the focus area 10 according to the movement of the touch input.

In a similar manner, after at least one of the focus area, the exposure area, and the white balance area is displayed on the touch screen 120, when the touch screen 120 senses movement of a touch input on at least one of the at least one areas, the touch screen 120 may move the area on which the touch input has occurred according to the movement of the touch input.

Figure 11A:
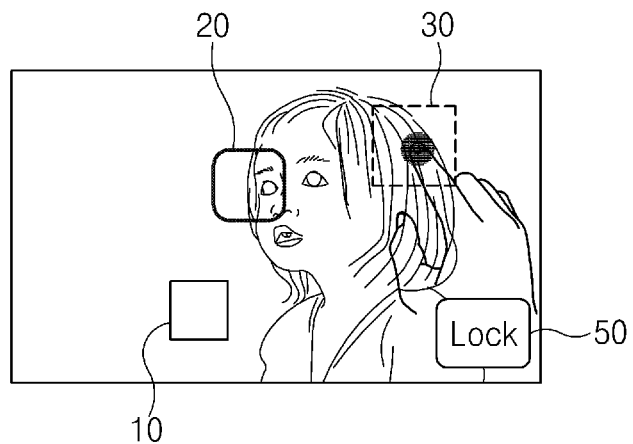
FIGS. 11A and 11B are diagrams illustrating a screen on which the focus area and the white balance area are overlapped due to movement of the set white balance area, according to an embodiment of the present invention.
Figure 11B:
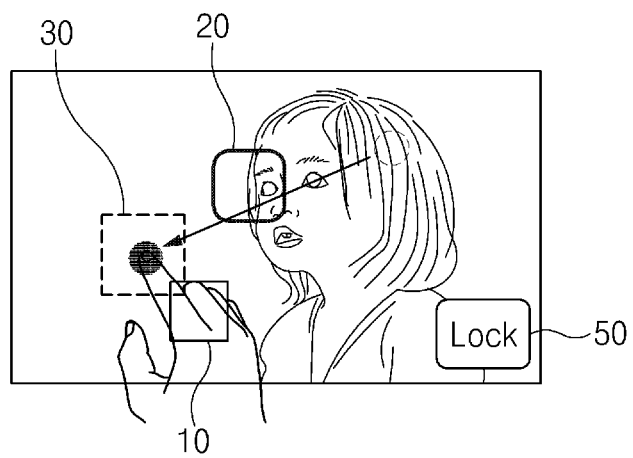

FIGS. 11A and 11B are diagrams illustrating a screen on which the focus area and the white balance area are overlapped due to movement of the set white balance area, according to an embodiment of the present invention.

The focus area 10, the exposure area 20, and the white balance area 30 are used in describing this embodiment of the present invention. However, embodiments of the present invention are not limited thereto.

FIG. 11A is a diagram illustrating the white balance area 30 displayed on the touch screen 120 and selected by a touch of the user.

FIG. 11B is a diagram illustrating the white balance area 30 displayed on the touch screen 120 and moved by moving a touch by the user.

When the touch input on the white balance area 30 is moved on the touch screen 120 without being released, the touch screen 120 may move the white balance area 30 according to the movement of the touch input.

According to the embodiment of the present invention illustrated in FIG. 11B, due to the movement of the white balance area 30, the white balance area 30 may overlap the focus area 10 displayed on the touch screen. The touch screen 110 may display the white balance area 30 in front of the focus area 10 on the touch screen 120.

Figure 12A:
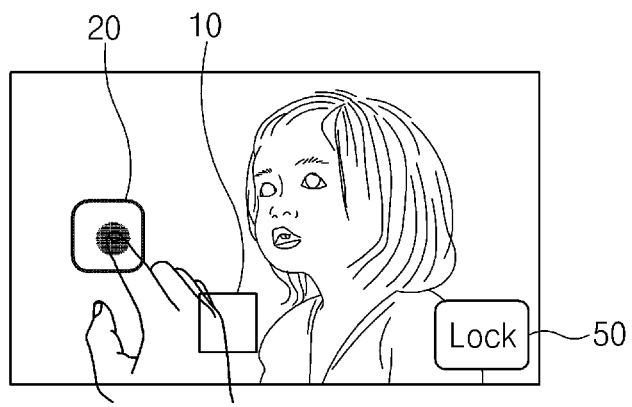
FIGS. 12A and 12B are diagrams illustrating a screen on which the focus area and the white balance area are overlapped due to generation of the white balance area, according to an embodiment of the present invention.
Figure 12B:
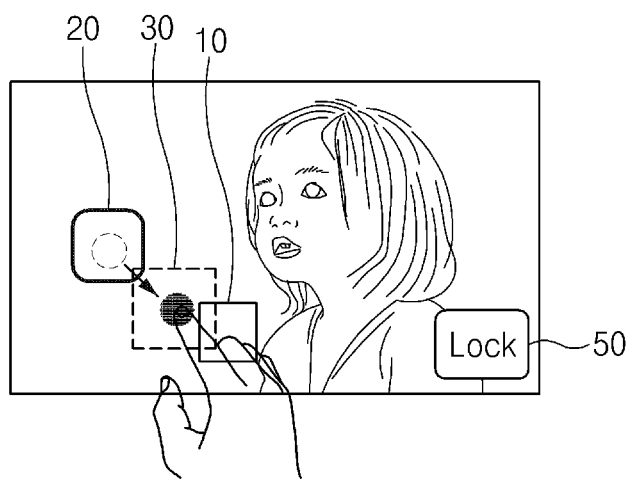

FIGS. 12A and 12B are diagrams illustrating a screen on which the focus area and the white balance area are overlapped due to generation of the white balance area, according to an embodiment of the present invention.

The focus area 10, the exposure area 20 and the white balance area 30 are used in describing this embodiment of the present invention. However, embodiments of the present invention are not limited thereto.

FIG. 12A is a diagram illustrating the exposure area 20 displayed on the touch screen 120 and selected by a touch of the user.

FIG. 12B is a diagram illustrating that the white balance area 30 is generated from the exposure area 20 on the touch screen 120.

When the touch input that has occurred on the exposure area 20 is moved on the touch screen 120 without being released after being held for a predetermined period of time, the white balance area 30 may be generated on the touch screen 120.

According to the embodiment of the present invention illustrated in FIG. 12B, due to the generation of the white balance area 30, the white balance area 30 may overlap the focus area 10 displayed on the touch screen. Here, the touch screen 110 may display the white balance area 30 in front of the focus area 10 on the touch screen 120.

As described above, after at least two of the focus area, the exposure area, and the white balance area are displayed on the touch screen 120, when overlap between the at least two areas occurs, the touch screen 120 may display one of the at least two areas, on which a touch input has more recently occurred, in front of the other on the touch screen 120.

Figure 13A:
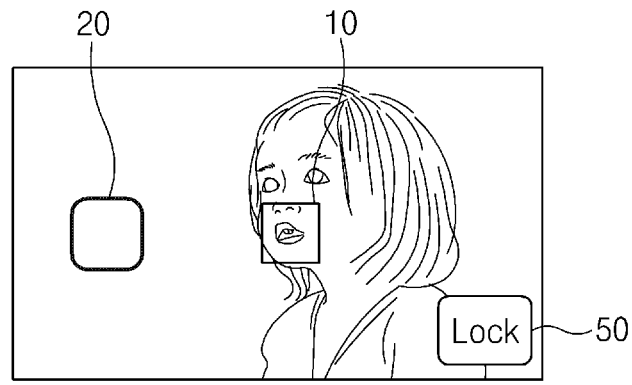
FIGS. 13A to 13C are diagrams illustrating a screen on which a set exposure area is moved, according to an embodiment of the present invention.
Figure 13B:
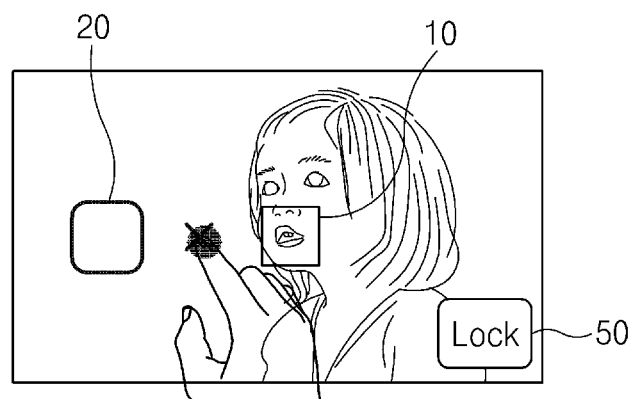
Figure 13C:
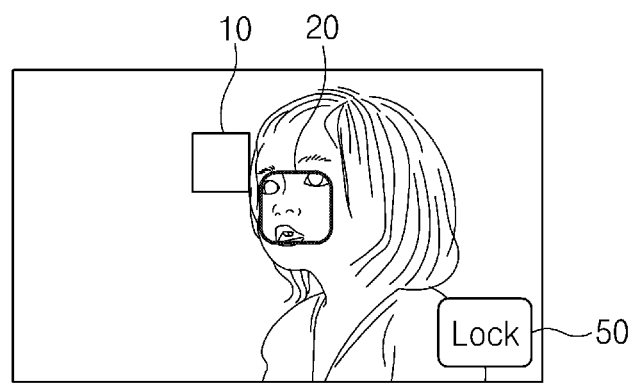

FIGS. 13A to 13C are diagrams illustrating a screen on which a set exposure area is moved, according to an embodiment of the present invention.

The focus area 10 and the exposure area 20 are used in describing this embodiment of the present invention. However, the embodiments of the present invention are not limited thereto.

FIG. 13A is a diagram illustrating the focus area 10 and the exposure area 20 set on the touch screen 120.

FIG. 13B is a diagram illustrating that the user touches an empty space on the touch screen 120.

The touch screen 120 may display the focus area 10 and the exposure area 20, and may sense a second touch input at a position (x) that does not overlap any area on the screen, i.e., the empty space. The second touch input is a new touch input occurring on the empty space. A position where the second touch input has occurred is referred to as a second position.

FIG. 13C is a diagram illustrating that the exposure area 20 is moved by the fourth touch input.

The touch screen 120 moves one of the focus area 10 and the exposure area 20, on which a touch input has more recently occurred, to the second position where the second touch input has occurred. For example, in the case where a touch on the exposure area 20 has occurred after occurrence of a touch on the focus area 10, the exposure area 20 may be moved to the second position by the second touch of the user.

As described above, after at least one of the focus area, the exposure area, and the white balance area is displayed on the touch screen 120, when the second touch input is sensed at a position that does not overlap the at least one area, the area among the at least one area, on which a touch input has most recently occurred, may be moved to the second touch area where the second touch input has occurred.

Figure 14A:
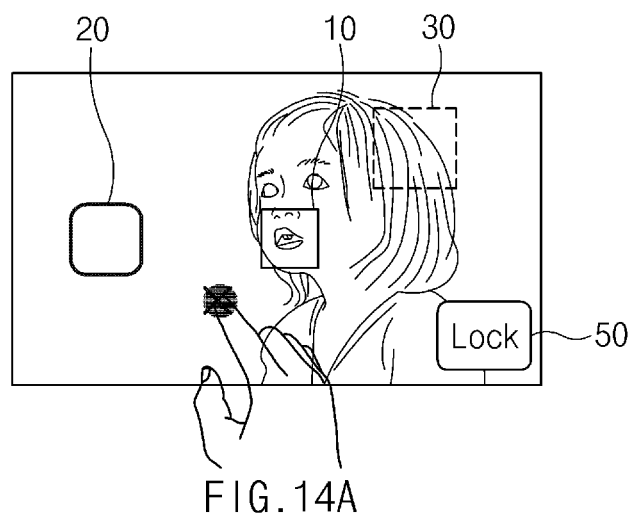
FIGS. 14A and 14B are diagrams illustrating a screen on which a setting is released, according to an embodiment of the present invention.
Figure 14B:

FIGS. 14A and 14B are diagrams illustrating a screen on which a setting is released, according to an embodiment of the present invention.

The focus area 10, the exposure area 20, and the white balance area 30 are used in describing this embodiment of the present invention. However, the embodiments of the present invention are not limited thereto.

FIG. 14A is a diagram illustrating that the user touches an empty space on the touch screen 120.

The touch screen 120 may display the focus area 10, the exposure area 20, and the white balance area 30, and may sense a predetermined touch input at a position (x) that does not overlap any area on the screen, i.e., the empty space.

According to an embodiment of the present invention, the predetermined touch input may be a double tap or a long touch.

FIG. 14B is a diagram illustrating that all areas set on the touch screen 120 are released by the predetermined touch input of the user.

Specifically, in response to the predetermined touch input of the user, the touch screen 120 removes the focus area 10, the exposure area 20, and the white balance area 30 set on the screen.

As described above, after at least one of the focus area, the exposure area, and the white balance area is displayed on the touch screen 120, when the predetermined touch input is sensed at a position that does not overlap the at least one area, the at least one area may be removed from the touch screen 120.

Figure 15A:
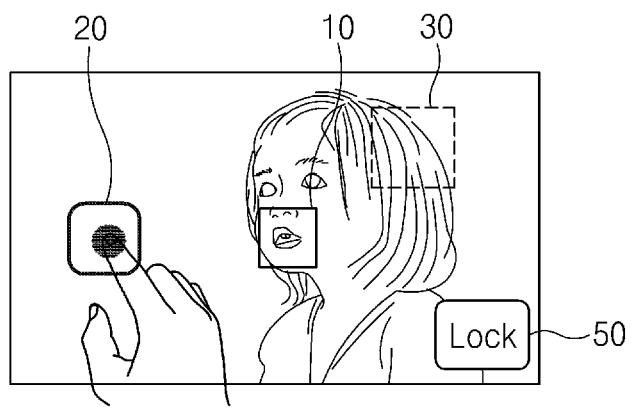
FIGS. 15A and 15B are diagrams illustrating a screen on which a setting is released, according to an embodiment of the present invention.
Figure 15B:
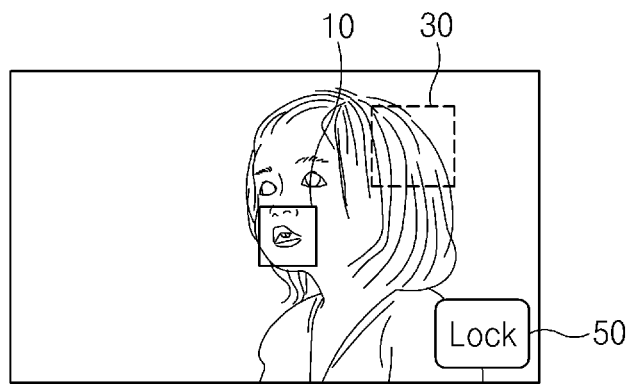

FIGS. 15A and 15B are diagrams illustrating a screen on which a setting is released, according to an embodiment of the present invention.

The focus area 10, the exposure area 20, and the white balance area 30 are used in describing this embodiment of the present embodiment. However, the embodiments of the present invention are not limited thereto.

FIG. 15A is a diagram illustrating that the user touches the exposure area 20 displayed on the touch screen 120.

Specifically, the touch screen 120 displays the focus area 10, the exposure area 20, and the white balance area 30, and senses a predetermined touch input on the exposure area 20. According to an embodiment of the present invention, the predetermined touch input may be a double tap.

FIG. 15B is a diagram illustrating that the setting of the exposure area 20 on the touch screen 120 is released.

Specifically, in response to the predetermined touch input on the exposure area 20, the touch screen 120 removes the exposure area 20 displayed on the touch screen 120, so as to release the setting of the exposure area 20.

As described above, after at least one of the focus area, the exposure area, and the white balance area is displayed on the touch screen 120, when the predetermined touch input is sensed on an area, the area may be removed from the touch screen 120.

Figure 16:
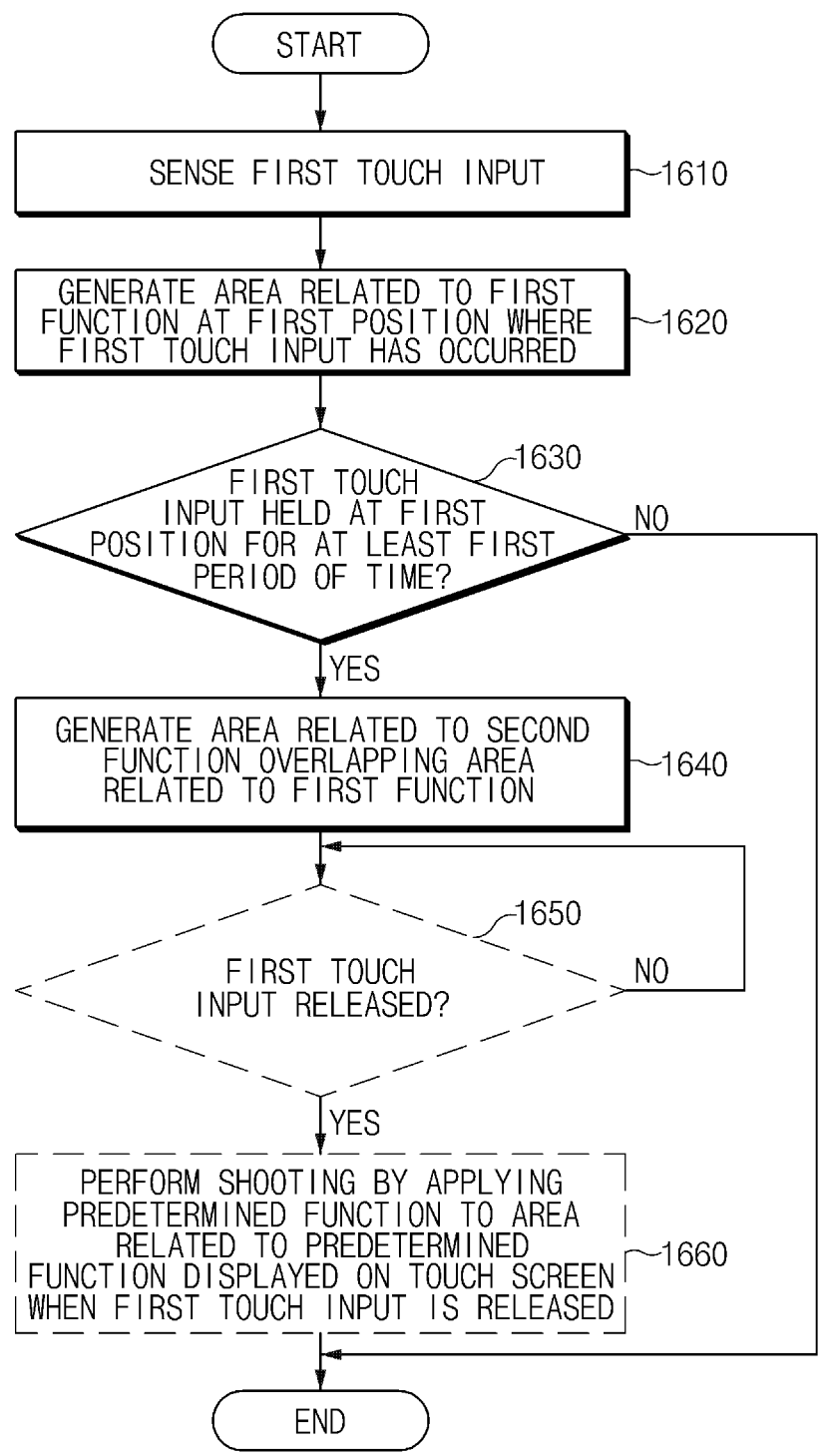
FIG. 16 is a flowchart illustrating a method for setting the image capture conditions, according to an embodiment of the present invention.

FIG. 16 is a flowchart illustrating a method for setting image capture conditions, according to an embodiment of the present invention. The flowchart illustrated in FIG. 16 includes processes that are performed in the electronic device 100 illustrated in FIG. 1.

According to this embodiment of the present invention, the area related to the first function and the area related to the second function are generated by a single touch on the touch screen 120.

The touch screen 120 senses the first touch input, in step 1610.

In step 1620, the touch screen 120 generates the area related to the first function at the first position where the first touch input has occurred. The control unit 130 may set the first function based on the area related to the first function generated on the touch screen 120.

In step 1630, the control unit 130 determines whether the first touch input is held for at least the first period of time at the first position. When the first touch input is not held at the first position for at least the first period of time, setting of the shooting condition other than the first function is completed.

When the first touch input is held at the first position for at least the first period of time, the touch screen 120 generates the area related to the second function at the first position overlapping the area related to the first function, in step 1640. The area related to the second function may have a shape and a size that are different from those of the area related to the first function.

According to an embodiment of the present invention, the flowchart of FIG. 16 may further include steps 1650 and 1660. According to an embodiment of the present invention, the area related to the first function and the area related to the second function are generated by a single touch on the touch screen 120, and the first function and the second function are set so as to capture a photograph.

In step 1650, the control unit 130 determines whether the first touch input is released. When the first touch input is not released, the process repeats step 1650.

When the first touch input is released, the camera module 110 applies a predetermined function to an area related to the predetermined function displayed on the touch screen 120 at the time of the release of the first touch input, in step 1660 so as to capture a photograph.

Figure 17:
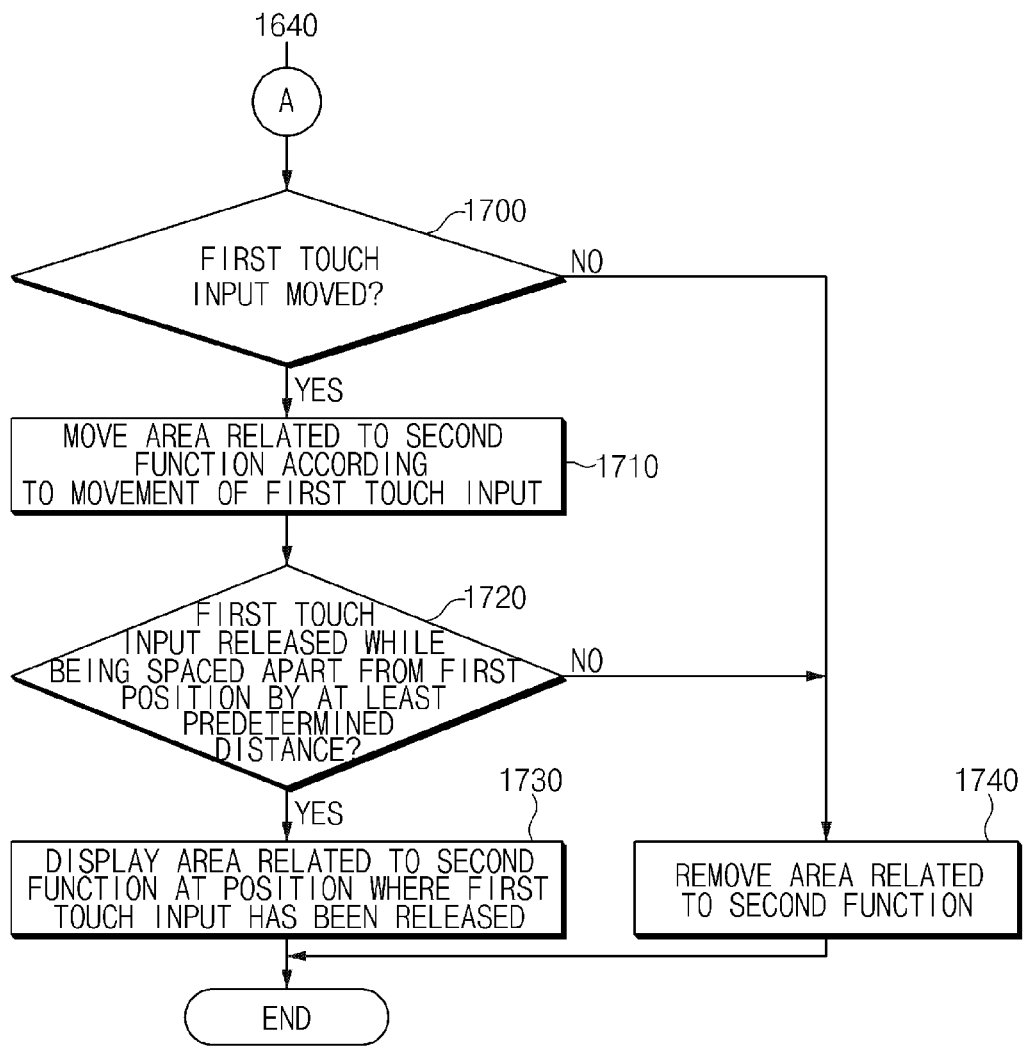
FIG. 17 is a flowchart illustrating a method for setting the image capture conditions, according to an embodiment of the present invention.

FIG. 17 is a flowchart illustrating a method for setting the image capture conditions, according to an embodiment of the present invention. The flowchart illustrated in FIG. 17 includes processes that are performed in the electronic device 100 illustrated in FIG. 1.

According to an embodiment of the present invention, steps 1700 to 1740 of FIG. 17 may follow step 1640 of FIG. 16. According to an embodiment of the present invention, the area related to the first function and the area related to the second function may be generated at different positions by a single touch on the touch screen 120.

In step 1700, the control unit 130 determines whether the first touch input is moved. When the first touch input is moved, the process proceeds to step 1710. When the first touch input is not moved, the process proceeds to step 1740.

In step 1710, the touch screen 120 moves the area related to the second function according to the movement of the first touch input. The area related to the first function is maintained at the first position without being moved with the area related to the second function. Accordingly, the area related to the second function may be moved separately from the area related to the first function.

In step 1720, the control unit 130 determines whether the first touch input is released while being spaced apart from the first position by at least a predetermined distance. When the first touch input is released while being spaced apart from the first position by at least the predetermined distance, the process proceeds to step 1730. When the first touch input is released while not being spaced apart from the first position by at least the predetermined distance, the process proceeds to step 1740.

In step 1730, the touch screen 120 displays the area related to the second function at a position where the first touch input has been released. Accordingly, the area related to the first function and the area related to the second function may be set by a single touch input.

In step 1740, the touch screen 120 removes the area related to the second function. Accordingly, the setting of the area related to the second function may be cancelled.

Figure 18:
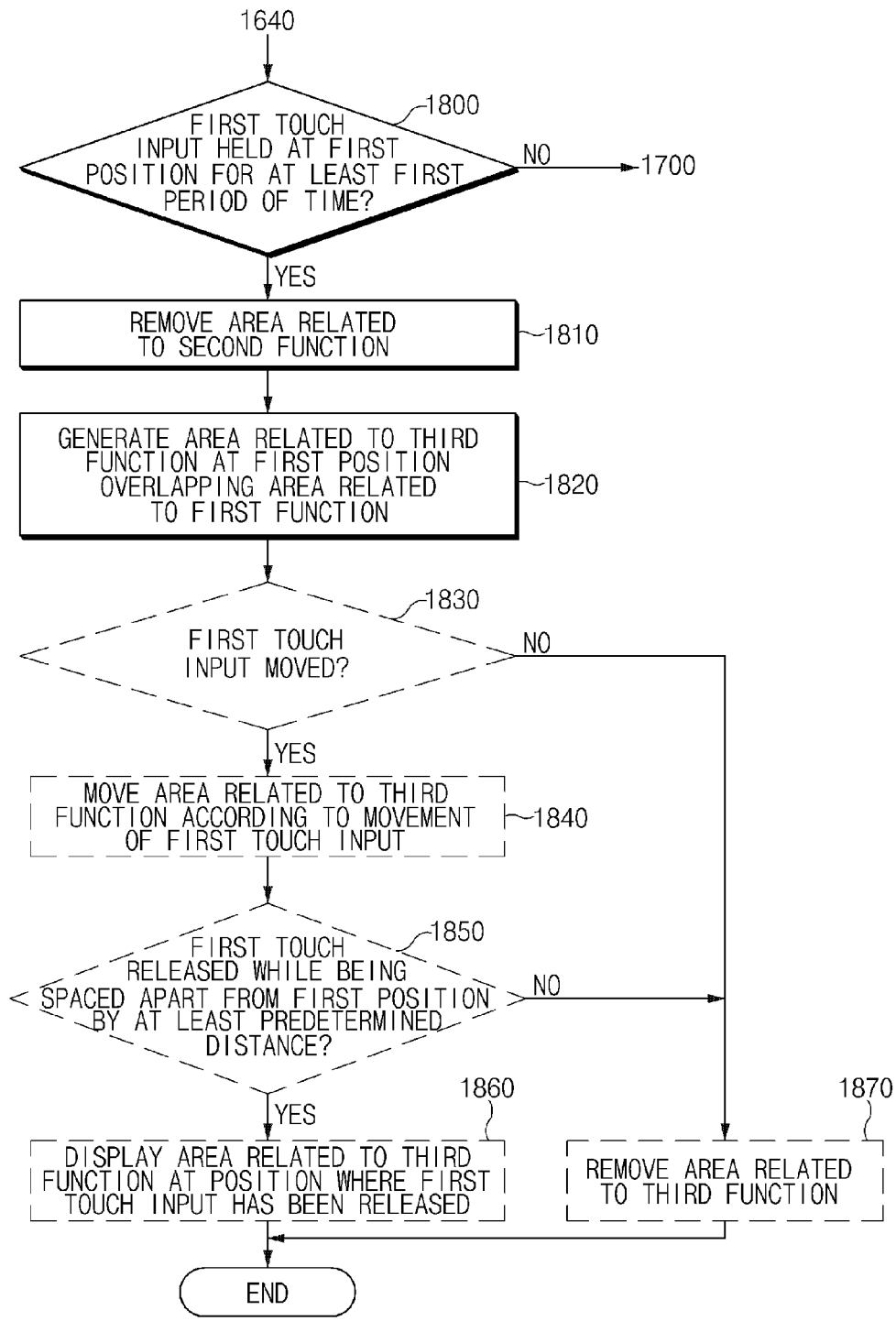
FIG. 18 is a flowchart illustrating a method for setting the image capture conditions, according to an embodiment of the present invention.

FIG. 18 is a flowchart illustrating a method for setting the image capture conditions, according to an embodiment of the present invention. The flowchart illustrated in FIG. 18 includes processes that are performed in the electronic device 100 illustrated in FIG. 1.

According to an embodiment of the present invention, the flowchart of FIG. 18 may be added at a position A of FIG. 17. According to an embodiment of the present invention, after the area related to the first function and the area related to the second function are generated, the area related to the third function may be directly generated from the area related to the first function by a single touch on the touch screen 120 instead of inputting a new touch input.

In step 1800, the control unit 130 determines whether the first touch input is held for at least a second period of time at the first position. The second period of time is longer than the first period of time. When the first touch input is held at the first position for at least the second period of time, the process proceeds to step 1810. When the first touch input is not held at the first position for at least the second period of time, the process proceeds to step 1700 of FIG. 17.

In step 1810, the touch screen 120 removes the area related to the second function. Accordingly, the setting of the area related to the second function may be cancelled.

In step 1820, the touch screen 120 generates the area related to the third function at the first position overlapping the area related to the first function. The area related to the third function may have a shape and a size different from those of the area related to the first function and the area related to the second function.

According to an embodiment of the present invention, the flowchart of FIG. 18 may further include steps 1830 to 1870.

In step 1830, the control unit 130 determines whether the first touch input is moved. When the first touch input is moved, the process proceeds to step 1840. When the first touch input is not moved, the process proceeds to step 1870.

In step 1840, the touch screen 120 moves the area related to the third function according to the movement of the first touch input. The area related to the first function is maintained at the first position without being moved with the area related to the third function. Accordingly, the area related to the third function may be separated from the area related to the first function so as to be moved.

In step 1850, the control unit 130 determines whether the first touch input is released while being spaced apart from the first position by at least the predetermined distance. When the first touch input is released while being spaced apart from the first position by at least the predetermined distance, the process proceeds to step 1860. When the first touch input is released while not being spaced apart from the first position by at least the predetermined distance, the process proceeds to step 1870.

In step 1860, the touch screen 120 displays the area related to the third function at a position where the first touch input has been released. Accordingly, the area related to the first function and the area related to the third function may be set by a single touch.

In step 1870, the touch screen 120 removes the area related to the third function. Accordingly, the generation of the area related to the third function may be cancelled.

Figure 19:
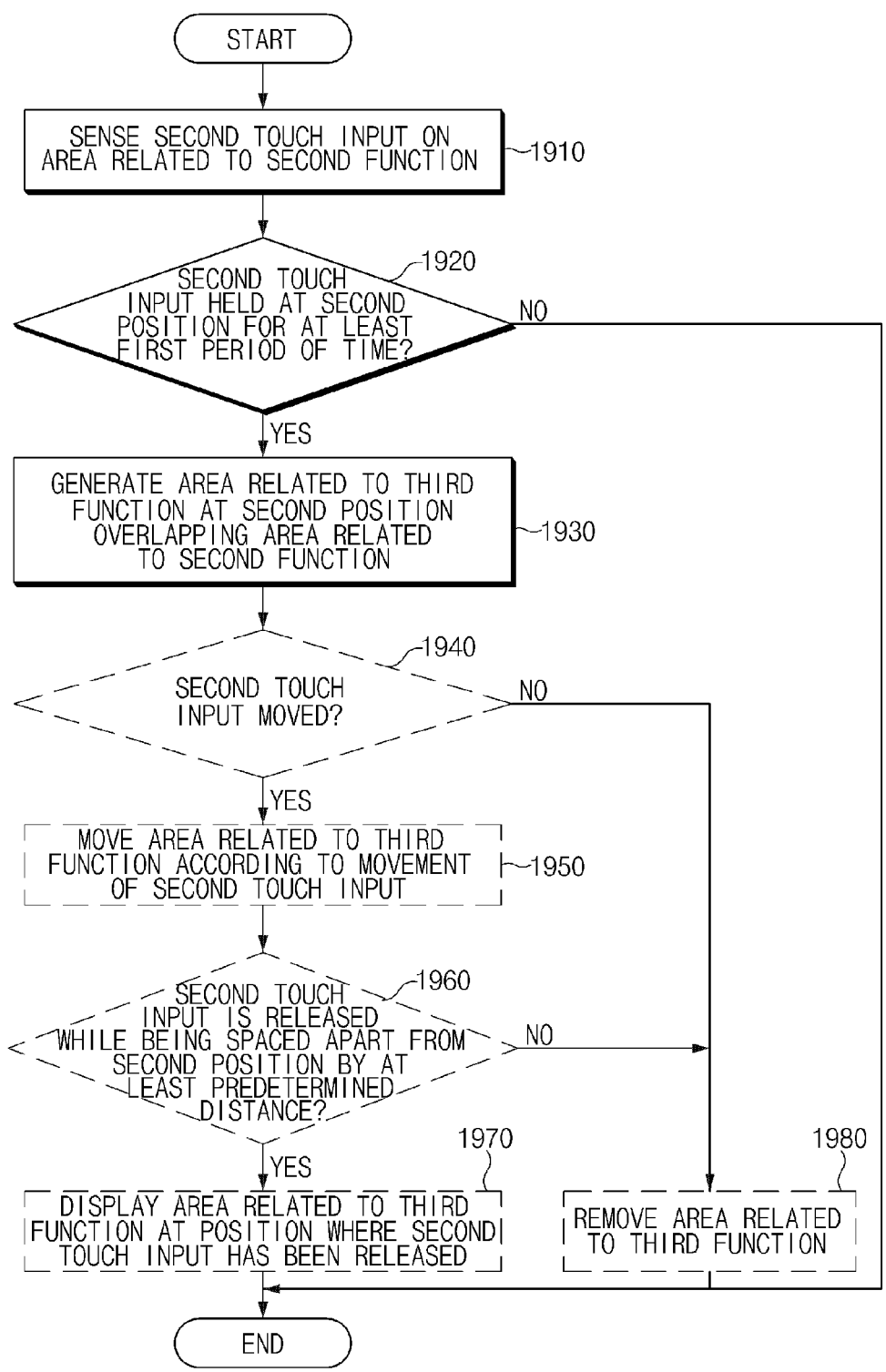
FIG. 19 is a flowchart illustrating a method for setting the image capture conditions, according to an embodiment of the present invention.

FIG. 19 is a flowchart illustrating a method for setting the image capture conditions, according to an embodiment of the present invention. The flowchart illustrated in FIG. 19 includes processes that are performed in the electronic device 100 illustrated in FIG. 1.

In this embodiment of the present invention, the area related to the third function is generated by using the area related to the second function, which was previously generated and displayed on the touch screen 120.

In step 1910, the touch screen 120 senses a second touch input on the area related to the second function.

In step 1920, the control unit 130 determines whether the second touch input is held for at least the first period of time at a second position. The second position represents a position where the second touch input has occurred. When the second touch input is held at the second position for at least the first period of time, the process proceeds to step 1930. When the second touch input is not held at the second position for at least the first period of time, the setting of the image capture conditions is finished.

In step 1930, the control unit 130 generates the area related to the third function at the second position overlapping the area related to the second function.

According to an embodiment of the present invention, the flowchart of FIG. 19 may further include steps 1940 to 1980.

In step 1940, the control unit 130 determines whether the second touch input is moved. When the second touch input is moved, the process proceeds to step 1950. When the second touch input is not moved, the process proceeds to step 1980.

In step 1950, the touch screen 120 moves the area related to the third function according to the movement of the touch input. The area related to the second function is maintained at the second position without being moved with the area related to the third function. Accordingly, the area related to the third function may be moved separately from the area related to the second function.

In step 1960, the control unit 130 determines whether the second touch input is released while being spaced apart from the second position by at least the predetermined distance. When the second touch input is released while being spaced apart from the second position by at least the predetermined distance, the process proceeds to step 1970. When the second touch input is released while not being spaced apart from the second position by at least the predetermined distance, the process proceeds to step 1980.

In step 1970, the touch screen 120 displays the area related to the third function at a position where the second touch input has been released. Accordingly, the area related to the third function may be set apart from the area related to the second function.

In step 1980, the touch screen 120 removes the area related to the third function. Accordingly, the setting of the area related to the third function may be cancelled.

Figure 20:
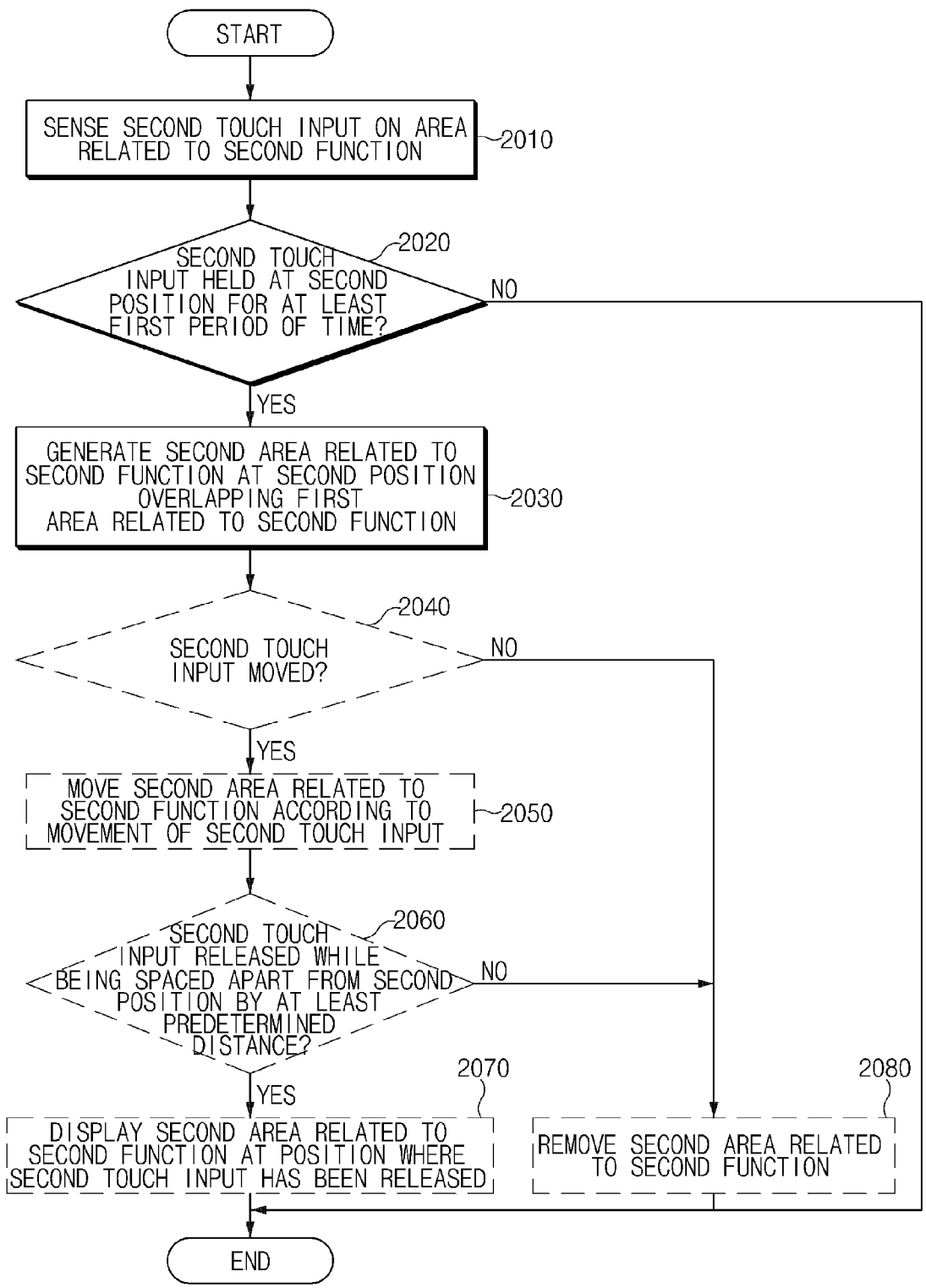
FIG. 20 is a flowchart illustrating a method for setting the image capture conditions, according to an embodiment of the present invention.

FIG. 20 is a flowchart illustrating a method for setting the image capture conditions, according to an embodiment of the present invention. The flowchart illustrated in FIG. 20 includes processes that are performed in the electronic device 100 illustrated in FIG. 1.

In this embodiment of the present invention, a new area related to the second function is generated by using the area related to the second function, which was previously generated and displayed on the touch screen 120. Hereinafter, the area related to the second function which was previously generated and displayed on the touch screen 120 is referred to as a first area related to the second function, and the newly generated area related to the second function is referred to as a second area related to the second function.

In step 2010, the touch screen 120 senses a second touch input on the first area related to the second function.

In step 2020, the control unit 130 determines whether the second touch input is held for at least the first period of time at a second position. The second position represents a position where the second touch input has occurred. When the second touch input is held at the third position for at least the first period of time, the process proceeds to step 2030. When the second touch input is not held at the third position for at least the first period of time, the setting of the image capture conditions is completed.

In step 2030, the control unit 130 generates the second area related to the second function at the second position overlapping the first area related to the second function.

According to an embodiment of the present invention, the flowchart of FIG. 20 may further include steps 2040 to 2080.

In step 2040, the control unit 130 determines whether the second touch input is moved. When the second touch input is moved, the process proceeds to step 2050. When the second touch input is not moved, the process proceeds to step 2080.

In step 2050, the touch screen 120 moves the second area related to the second function according to the movement of the touch input. The first area related to the second function is maintained at the second position without being moved with the second area related to the second function. Accordingly, the second area related to the second function may be moved separately from the first area related to the second function.

In step 2060, the control unit 130 determines whether the second touch input is released while being spaced apart from the second position by at least the predetermined distance. When the second touch input is released while being spaced apart from the second position by at least the predetermined distance, the process proceeds to step 2070. When the second touch input is released while not being spaced apart from the second position by at least the predetermined distance, the process proceeds to step 2080.

In step 2070, the touch screen 120 displays the second area related to the second function at a position where the second touch input has been released. Accordingly, the second area related to the second function may be set apart from the first area related to the second function.

In step 2080, the touch screen 120 removes the second area related to the second function. Accordingly, the setting of the second area related to the second function may be cancelled.

The above-described methods may be programmed to be executed by a computer, and may be implemented in a general digital computer which executes the program using a computer readable medium. The computer readable recording medium includes magnetic storage media (e.g., ROM, floppy disks, hard disks, etc.) and optical recording media (e.g., CD-ROMs, or DVDs).

The method for setting the image capture conditions and the electronic device according to various embodiments of the present invention may provide an interface enabling a user to set first and second functions at desired positions by a single touch.

Therefore, the user may easily set the image capture conditions through a simple touch on a screen without additionally learning control methods.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device, comprising:
a camera module configured to perform image capturing according to image capture conditions set by a processor;
a touch screen configured to display a screen according to a control signal of the processor and sense a touch input; and
the processor configured to:
control the touch screen so that the touch screen senses a first touch input in an image capture mode, generate a first area related to a first function at a first position where the first touch input is sensed, if the first touch input is held at the first position for less than a first period of time, and
generate the first area related to the first function at the first position and a second area related to the second function overlapping the first area if the first touch input is held at the first position for at least the first period of time,
set the first function for the camera module based on the first area, and
set the second function for the camera module based on the second area.

2. The electronic device according to claim 1, wherein each of the first function and the second function is one of an auto focus function, an auto exposure function, a white balance function, and a zoom and shooting-related function.

3. The electronic device according to claim 1, wherein the processor is further configured to perform image capturing by applying the first function and the second function to the first area and the second area at a time the first touch input is released.

4. The electronic device according to claim 1, wherein the processor is further configured to:
move the second area according to a movement of the first touch input, if the first touch input is moved on the touch screen; and
display the second area at a position where the first touch input is released, if the first touch input is released while being spaced apart from the first position by at least a predetermined distance.

5. The electronic device according to claim 4, wherein the processor is further configured to remove the second area from the touch screen, if the first touch input is released while being within the predetermined distance.

6. The electronic device according to claim 4, wherein, during the movement of the second area, the first area is maintained at the first position.

7. The electronic device according to claim 1, wherein the processor is further configured to generate a third area related to a third function overlapping the second area, if a second touch input is sensed on the second area and the second touch input is held for at least the first period of time.

8. The electronic device according to claim 7, wherein the processor is further configured to:
move the third area according to a movement of the second touch input, if the second touch input is moved on the touch screen; and
display the third area at a position where the second touch input is released, if the second touch input is released while being spaced apart from the second position by at least a predetermined distance.

9. The electronic device according to claim 8, wherein the processor is further configured to remove the third area from the touch screen, if the second touch input is released while being within the predetermined distance.

10. The electronic device according to claim 8, wherein, during the movement of the third area, the second area is maintained at the second position.

11. The electronic device according to claim 1, wherein the processor is further configured to remove the second area from the touch screen and generate a third area related to a third function at the first position overlapping the first area related to the first function, if the first touch input is maintained at the first position for at least a second period of time that is longer than the first period of time.

12. The electronic device according to claim 11, wherein the processor is further configured to:
move the third area according to a movement of the first touch input, if the first touch input is moved on the touch screen; and
display the third area at a position where the first touch input is released, if the first touch input is released while being spaced apart from the first position by at least a predetermined distance.

13. The electronic device according to claim 1, wherein the processor is further configured to generate a third area related to the second function overlapping the second area, if a third touch input is sensed on the second area and the third touch input is held for at least the first period of time,
wherein the third area related to the second function has a different size from that of the second area related to the second function.

14. The electronic device according to claim 13, wherein the processor is further configured to:
move the third area related to the second function according to a movement of the third touch input, if the third touch input is moved on the touch screen; and
display the third area related to second function at a position where the third touch input is released, if the third touch input is released while being spaced apart from the third position by at least a predetermined distance.

15. The electronic device according to claim 14, wherein the processor is further configured to generate a second instance of the third area related to the second function, move the second instance of the third area and display the second instance of the third area, so as to display a plurality of areas related to the second function at different positions on the touch screen.

16. The electronic device according to claim 14, wherein, if at least two areas related to the second function are displayed on the touch screen, the second function is set with an average of the at least two areas related to the second function.

17. The electronic device according to claim 14, wherein, if at least two areas related to the second function are displayed on the touch screen, the second function is sequentially set for each of the at least two areas related to the second function and image capturing is sequentially performed for each setting of the second function.

18. The electronic device according to claim 1, wherein the first area related to the first function and the second area related to the second function have at least one of different shapes and different sizes.

19. A method for setting image capture conditions, the method comprising:
sensing a first touch input on a touch screen in an image capture mode;
generating a first area related to a first function at a first position where the first touch input is sensed, if the first touch input is held at the first position for less than a first period of time;
generating the first area related to the first function at the first position and a second area related to a second function at the first position overlapping the first area, if the first touch input is held at the first position for at least the first period of time;
setting the first function for a camera module based on the first area; and
setting the second function for the camera module based on the second area.

20. The method according to claim 19, further comprising:
generating a third area related to a third function overlapping the second area related to the second function, if a second touch input is sensed on the second area and the second touch input is held for at least the first period of time.

21. An electronic device, comprising:
a camera module configured to perform image capturing;
a touch screen configured to display images and sense a touch input; and
a processor configured to:
control the touch screen to provide a camera user interface screen in which a preview image from the camera module is displayed in an image capture mode,
in response to sensing a touch input maintained over a preview image for at least a first period of time, via the touch screen in the image capture mode, provide a first icon related to a first function at a first area of a preview image where the touch input is sensed, and provide a second icon related to a second function at a second area overlapping the first area,
set the first function for the camera module based on the first area, and
set the second function for the camera module based on the second area.

22. The electronic device according to claim 21, wherein the first function comprises an auto focus function and the second function comprises one of an auto exposure function and a white balance function.

23. The electronic device according to claim 21, wherein the processor is further configured to perform image capturing by applying the first function and the second function to the first area and the second area, respectively.

* * * * *